US012374333B2

(12) United States Patent
Schillmoeller et al.

(10) Patent No.: US 12,374,333 B2
(45) Date of Patent: *Jul. 29, 2025

(54) VAS TOGGLE BASED ON DEVICE ORIENTATION

(71) Applicant: Sonos, Inc., Santa Barbara, CA (US)

(72) Inventors: Fiede Schillmoeller, Waterlands (NL); Connor Smith, New Hudson, MI (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/398,489

(22) Filed: Dec. 28, 2023

(65) Prior Publication Data

US 2024/0321272 A1    Sep. 26, 2024

Related U.S. Application Data

(63) Continuation of application No. 17/536,572, filed on Nov. 29, 2021, now Pat. No. 11,862,161, which is a
(Continued)

(51) Int. Cl.
*G10L 15/00*    (2013.01)
*G06F 3/0482*    (2013.01)
(Continued)

(52) U.S. Cl.
CPC ............ *G10L 15/22* (2013.01); *G06F 3/0482* (2013.01); *G06F 3/04842* (2013.01);
(Continued)

(58) Field of Classification Search
CPC ......... G10L 15/22; G10L 15/30; G10L 17/22; G06F 3/167
See application file for complete search history.

(56) References Cited

U.S. PATENT DOCUMENTS 9,443,519 B1 * 9/2016 Bakshi .................... G10L 15/26
9,632,748 B2    4/2017 Faaborg et al.
(Continued)

OTHER PUBLICATIONS

European Patent Office, European EPC Article 94.3 mailed on Jun. 4, 2024, issued in connection with European Application No. 21180778.9, 5 pages.
(Continued)

*Primary Examiner* — Daniel Abebe
(74) *Attorney, Agent, or Firm* — FORTEM IP LLP

(57) ABSTRACT

As noted above, example techniques relate to toggling a cloud-based VAS between enabled and disabled modes. An example implementation involves a NMD detecting that the housing is in a first orientation and enabling a first mode. Enabling the first mode includes disabling voice input processing via a cloud-based VAS and enabling local voice input processing. In the first mode, the NMD captures sound data associated with a first voice input and detects, via a local natural language unit, that the first voice input comprises sound data matching one or more keywords. The NMD determines an intent of the first voice input and performs a first command according to the determined intent. The NMD may detect that the housing is in a second orientation and enables the second mode. Enabling the second mode includes enabling voice input processing via the cloud-based VAS.

20 Claims, 17 Drawing Sheets

Related U.S. Application Data continuation of application No. 16/660,197, filed on Oct. 22, 2019, now Pat. No. 11,189,286.

(51) Int. Cl.

| | | |
|---|---|---|
| *G06F 3/04842* | (2022.01) | |
| *G06F 3/16* | (2006.01) | |
| *G10L 15/18* | (2013.01) | |
| *G10L 15/22* | (2006.01) | |
| *G10L 15/26* | (2006.01) | |
| *G10L 17/22* | (2013.01) | |

(52) U.S. Cl.
CPC .......... *G06F 3/167* (2013.01); *G10L 15/1815* (2013.01); *G10L 15/1822* (2013.01); *G10L 15/26* (2013.01); *G10L 17/22* (2013.01)

(56) References Cited

U.S. PATENT DOCUMENTS

| | | |
|---|---|---|
| 10,152,969 B2 | 12/2018 | Reilly et al. |
| 10,248,376 B2 | 4/2019 | Keyser-Allen et al. |
| 10,720,173 B2 | 7/2020 | Freeman et al. |
| 11,443,741 B2* | 9/2022 | Huang .................... G06F 3/167 |
| 11,700,139 B2 | 7/2023 | Drake |
| 2010/0057451 A1* | 3/2010 | Carraux .................. G10L 15/30 704/E15.04 |
| 2017/0287496 A1 | 10/2017 | Heitkamp et al. |
| 2018/0040324 A1 | 2/2018 | Wilberding |
| 2019/0172461 A1* | 6/2019 | Jin ......................... G10L 15/30 |
| 2019/0259408 A1 | 8/2019 | Freeman et al. |
| 2021/0287670 A1 | 9/2021 | Regan et al. |
| 2021/0358496 A1* | 11/2021 | Sukumar ............... G10L 13/047 |

OTHER PUBLICATIONS

Non-Final Office Action mailed on Jun. 20, 2024, issued in connection with U.S. Appl. No. 18/007,415, filed Jan. 30, 2023, 12 pages.

Non-Final Office Action mailed on Jun. 20, 2024, issued in connection with U.S. Appl. No. 18/520,336, filed Nov. 27, 2023, 20 pages.

Notice of Allowance mailed on Jun. 7, 2024, issued in connection with U.S. Appl. No. 18/316,434, filed May 12, 2023, 9 pages.

* cited by examiner

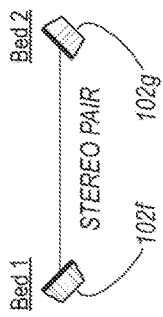
*Fig. 3B*
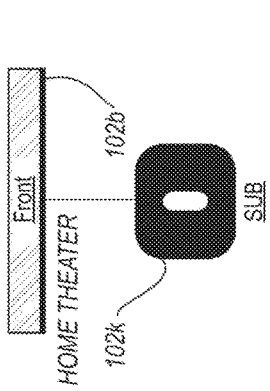
*Fig. 3C*
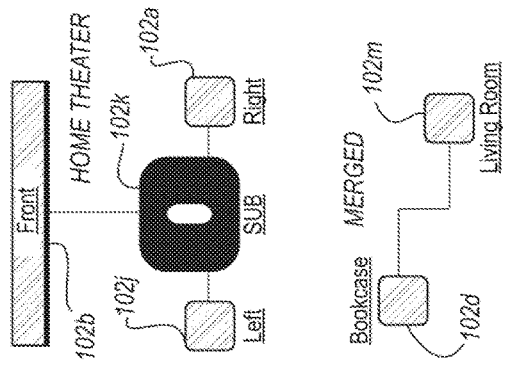
*Fig. 3D*
*Fig. 3E*
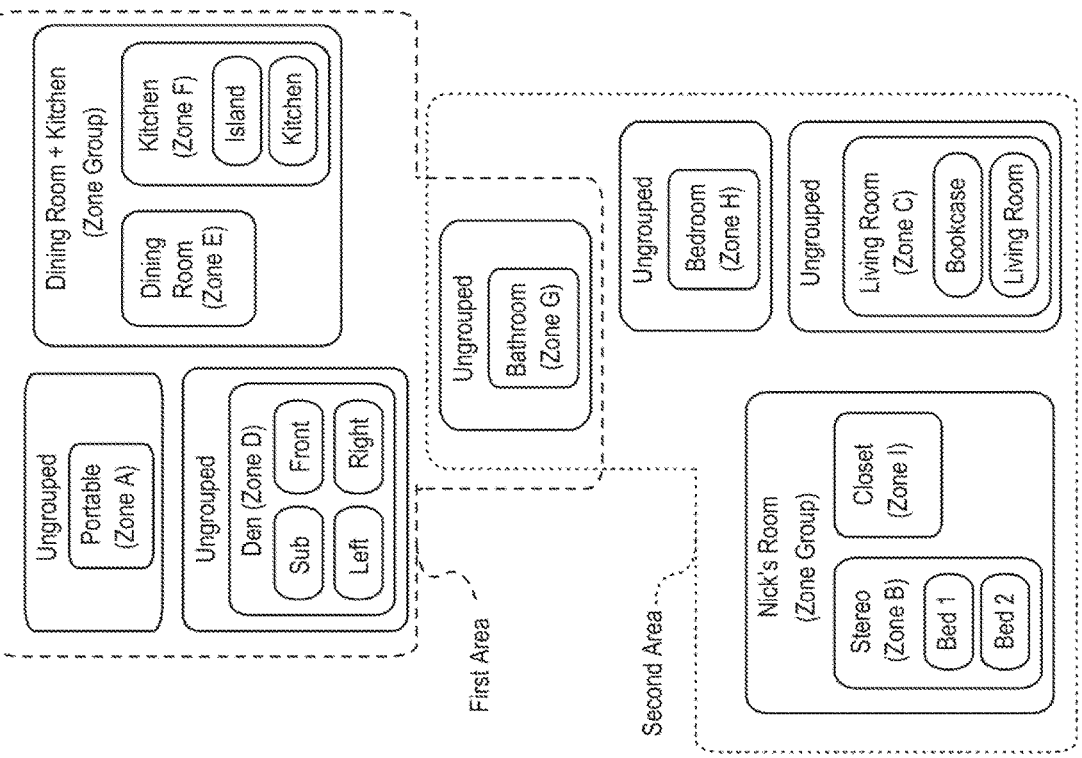
*Fig. 3A*

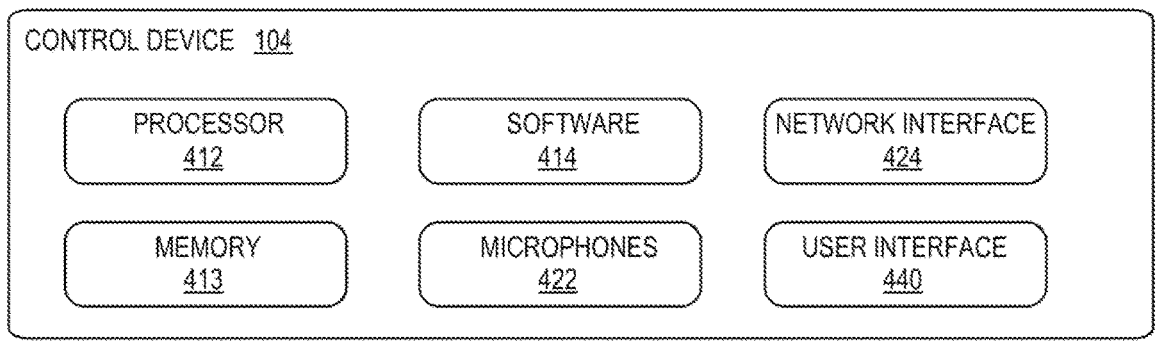
Fig. 4
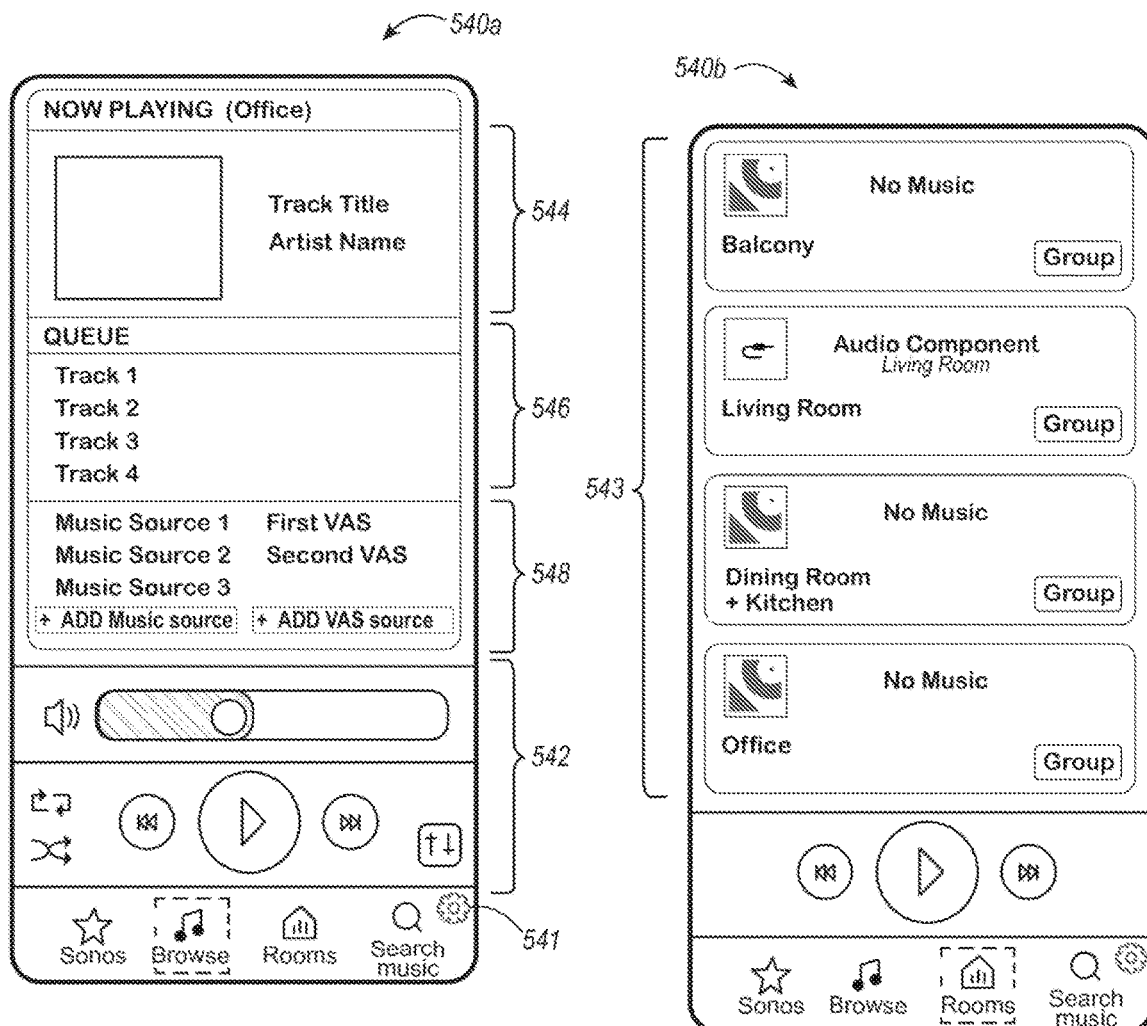
Fig. 5A
Fig. 5B

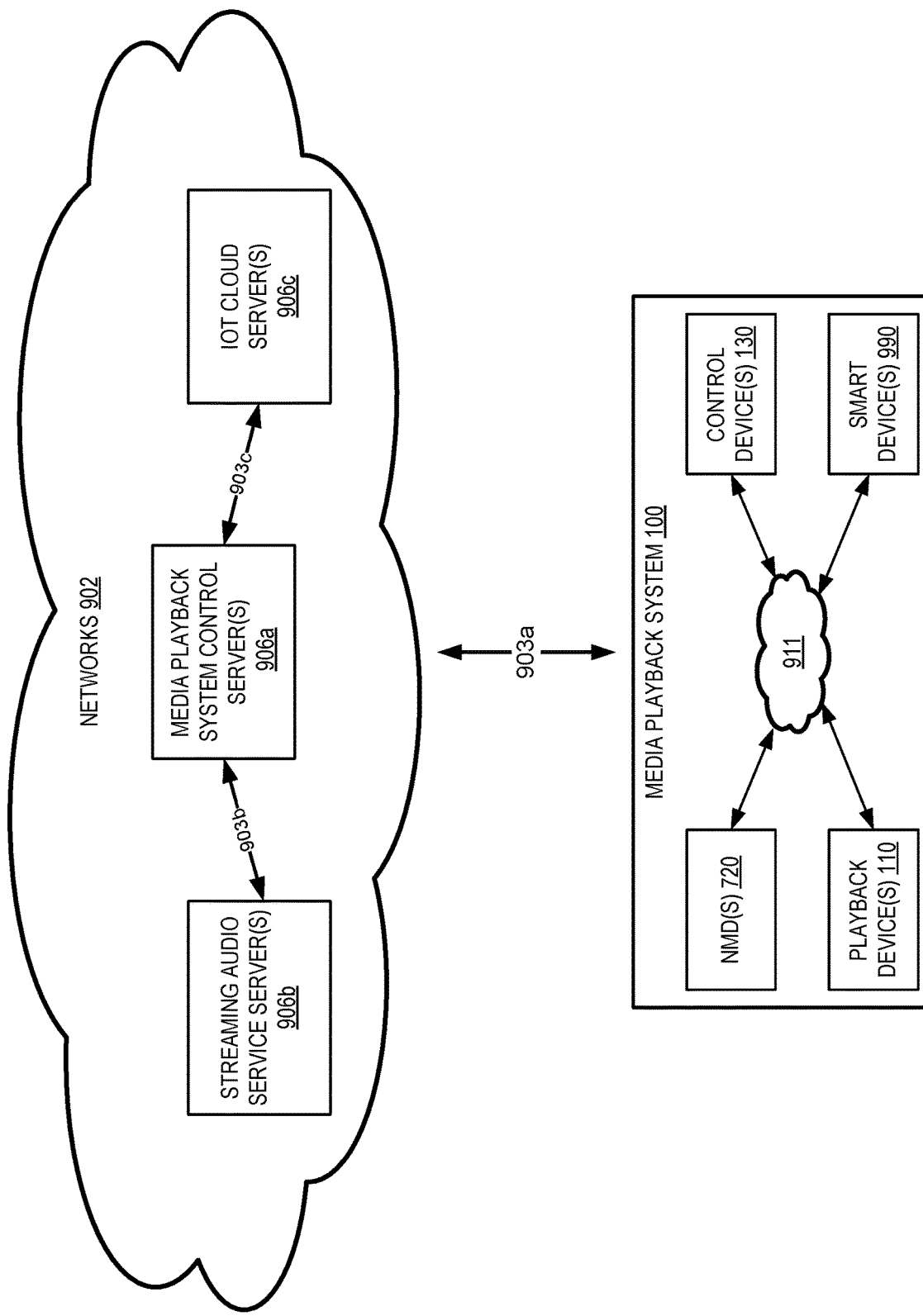

***SCENARIO 1***

ACTIVE TRIGGERS:
    ASR: [play, stop, resume, turn on]
    NLU: [ ]

NEW RECOGNITION DETECTED----------------------------------
  Detected Command Word: play ASR / NLU Results
    ASR: turn on
    Intent: <Inactive>
    Conf : xxxx VAD and Noise Classifier:
    Noise Classifier Frame Counts – {ambient: 11, background_speech 127: , fan: 12}
    VAD Frame Counts – {voice: 140, non-voice: 11}
    RESULT: VAD indicates speech activity; Noise Classifier 766 indicates background speech
  >> VAD and Noise Classifier have decided that the trigger=False Command has been DECLINED

*Fig. 10A*

***SCENARIO 2***

ACTIVE TRIGGERS:
    ASR: [play, play something, play me a song]
    NLU: [ ]

NEW RECOGNITION DETECTED----------------------------------
  Detected Command Word: play something ASR / NLU Results
    ASR: can you play something
    Intent: <Inactive>
    Conf : xxxx VAD and Noise Classifier:
    Classifier Frame Counts – {ambient: 18, background_speech 8: , fan: 124}
    VAD Frame Counts – {voice: 6, non-voice: 144}
    RESULT: Noise Classifier 766 indicates fan noise
  >> VAD 765 and Noise Classifier 766 have decided that the trigger=True Command has been ACCEPTED

*Fig. 10B*

```
*****SCENARIO 3*****

ACTIVE TRIGGERS:
      ASR: [play, stop, resume]
      NLU: [ ]

NEW RECOGNITION DETECTED----------------------------------
   Detected Command Word: play ASR / NLU Results
      ASR: play beet les in the kitchen
      Intent: playMusic
                        slot1: location=kitchen
                        slot2: content=The Beatles
      Conf : 0.63428231948273443

VAD and Noise Classifier:
      Noise Classifier Frame Counts – {ambient: 142, background_speech 8: , fan: 0}
      VAD Frame Counts – {voice: 112, non-voice: 38}
      RESULT: Noise Classifier 766 indicates ambient noise
   >> VAD and Noise Classifier have decided that the trigger=True Command has been ACCEPTED
```

*Fig. 10C*

```
*****SCENARIO 4*****

ACTIVE TRIGGERS:
      ASR: [ ]
      NLU: [playMusic, resumeMusic, speakerInterrupt]

NEW RECOGNITION DETECTED----------------------------------
   Detected Command Word: play something ASR / NLU Results
      ASR: lay some music in the office
      Intent: playMusic
                        slot: location=office
      Conf : 0.14620494842529297

VAD and Noise Classifier:
      Classifier Frame Counts – {ambient: 137, background_speech 13: , fan: 0}
      VAD Frame Counts – {voice: 139, non-voice: 11}
      RESULT: Noise Classifier 766 indicates ambient
   >> VAD 765 and Noise Classifier 766 have decided that the trigger=True Command has been ACCEPTED
```

*Fig. 10D*

VAS TOGGLE BASED ON DEVICE ORIENTATION

CROSS-REFERENCE TO RELATED APPLICATIONS

This application is a continuation of U.S. patent application Ser. No. 17/536,572, filed Nov. 29, 2021, issued as U.S. Pat. No. 11,862,161 on Jan. 2, 2024, which is a continuation of U.S. patent application Ser. No. 16/660,197, filed on Oct. 22, 2019, issued as U.S. Pat. No. 11,189,286 on Nov. 30, 2021, each of which is incorporated herein by reference in its entirety.

FIELD OF THE DISCLOSURE

The present technology relates to consumer goods and, more particularly, to methods, systems, products, features, services, and other elements directed to voice-assisted control of media playback systems or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings where:

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIGS. 3A, 3B, 3C, 3D and 3E are diagrams showing example playback device configurations in accordance with aspects of the disclosure.

FIG. 4 is a functional block diagram of an example controller device in accordance with aspects of the disclosure.

FIGS. 5A and 5B are controller interfaces in accordance with aspects of the disclosure.

FIG. 9 is a schematic diagram illustrating an example media playback system and cloud network in accordance with aspects of the disclosure.

FIGS. 10A, 10B, 10C, and 10D show exemplary output of an example NMD configured in accordance with aspects of the disclosure.

Figure 1A:
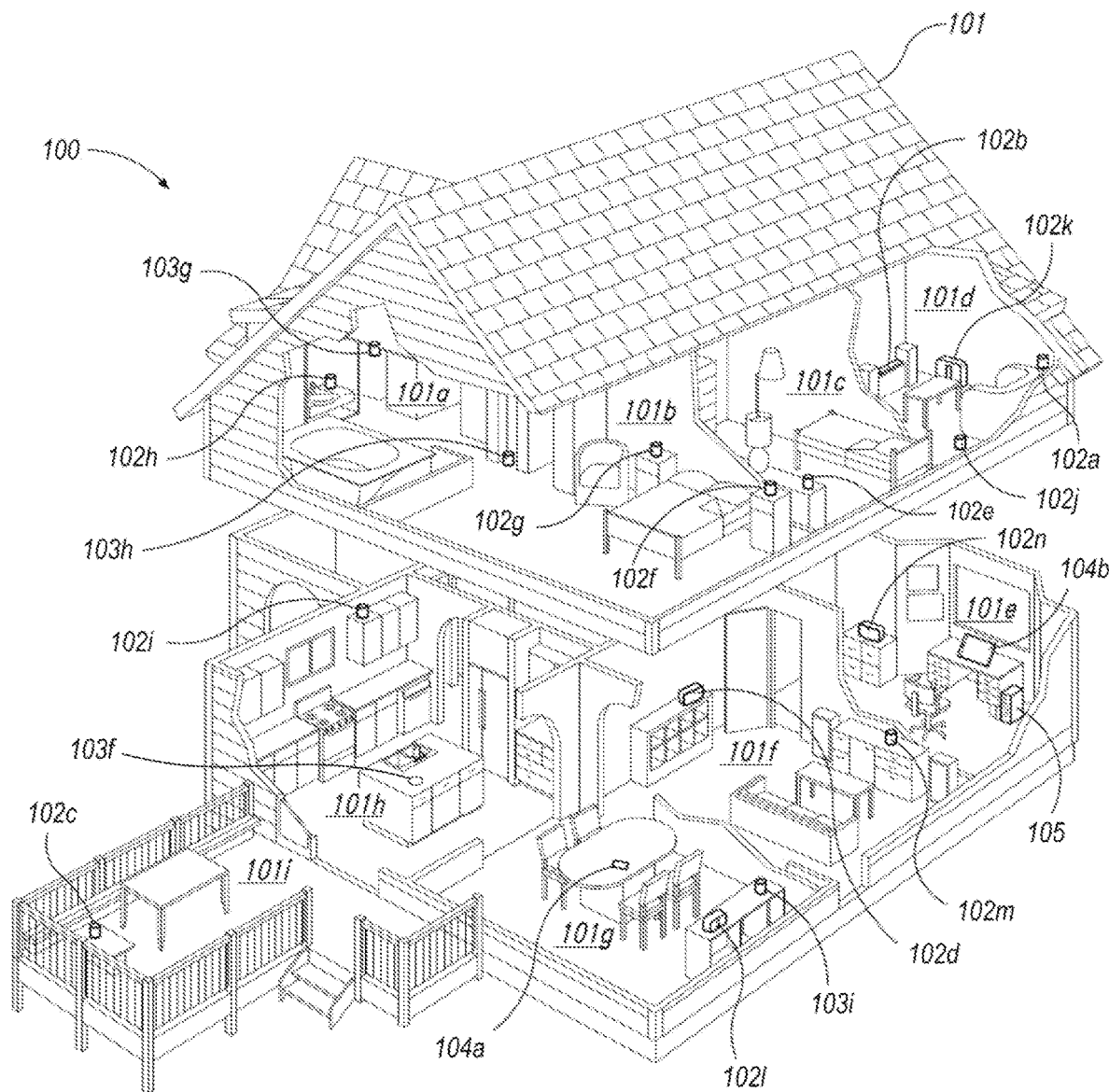
FIG. 1A is a partial cutaway view of an environment having a media playback system configured in accordance with aspects of the disclosed technology.

The drawings are for purposes of illustrating example embodiments, but it should be understood that the inventions are not limited to the arrangements and instrumentality shown in the drawings. In the drawings, identical reference numbers identify at least generally similar elements. To facilitate the discussion of any particular element, the most significant digit or digits of any reference number refers to the Figure in which that element is first introduced. For example, element 103a is first introduced and discussed with reference to FIG. 1A.

DETAILED DESCRIPTION

I. Overview

Example techniques described herein involve toggling voice input processing via a cloud-based voice assistant service ("VAS"). An example network microphone device ("NMD") may enable or disable processing of voice inputs via a cloud-based voice assistant service based on the physical orientation of the NMD. While processing of voice inputs via the cloud-based VAS is disabled, the NMD may process voice inputs via a local natural language unit (NLU).

An NMD is a networked computing device that typically includes an arrangement of microphones, such as a microphone array, that is configured to detect sound present in the NMD's environment. NMDs may facilitate voice control of smart home devices, such as wireless audio playback devices, illumination devices, appliances, and home-automation devices (e.g., thermostats, door locks, etc.). NMDs may also be used to query a cloud-based VAS for information such as search queries, news, weather, and the like.

Some users are apprehensive of sending their voice data to a cloud-based VAS for privacy reasons. One possible advantage of a processing voice inputs via a local NLU is increased privacy. By processing voice utterances locally, a user may avoid transmitting voice recordings to the cloud (e.g., to servers of a voice assistant service). Further, in some implementations, the NMD may use a local area network to discover playback devices and/or smart devices connected to the network, which may avoid providing personal data relating to a user's home to the cloud. Also, the user's preferences and customizations may remain local to the NMD(s) in the household, perhaps only using the cloud as an optional backup. Other advantages are possible as well.

On the other hand, a cloud-based VAS is relatively more capable than a local NLU. In contrast to a NLU implemented in one or more cloud servers that is capable of recognizing a wide variety of voice inputs, practically, local NLUs are capable of recognizing a relatively smaller library of keywords (e.g., 10,000 words and phrases). Moreover, the cloud-based VAS may support additional features (such a querying for real-time information) relative to a local NLU. Moreover, the cloud-based VAS may integrate with other cloud-based services to provide voice control of those services.

Given these competing interests, a user may desire to selectively disable voice input processing via a cloud-based VAS (in favor of voice input processing via a local NLU). When voice input processing via the cloud-based VAS is disabled, the user has the benefit of increased privacy. Conversely, when voice input processing via the cloud-based VAS is enabled, the user may take advantage of the relatively more capable cloud-based VAS.

Example NMDs may selectively disable voice input processing via a cloud-based VAS using physical orientation of its housing. For instance, an example NMD may be implemented with a cylindrical-shaped housing (e.g., similar in shape to a hockey puck). The first and second ends of the housing may carry a first set of microphones and a second set of microphones, respectively.

When the cylindrical-shaped housing is placed on its first end (i.e., in a first orientation), the NMD disables voice input processing via a cloud-based VAS. Conversely, when the cylindrical-shaped housing is placed on its second end (i.e., in a second orientation), the NMD enables voice input processing via a cloud-based VAS. Disabling cloud-based processing using physical orientation may instill confidence in a user that their privacy is being protected, as the microphones associated with the cloud-based VAS are partially covered by whatever surface the housing of the network microphone device is resting upon.

Other example network microphone devices may implement different toggling techniques. For instance, the NMD may include a physical switch or other hardware control to toggle voice processing via the cloud-based VAS. Alternatively, a graphical user interface (GUI) or voice user interface (VUI) may be used to toggle voice processing via the cloud-based VAS.

Example NMDs that selectively disable voice input processing via a cloud-based VAS using physical orientation may include two or more sets of microphones. For instance, a first set of microphones may be utilized to capture audio in a first orientation while a second set of microphones is utilized in a second orientation. Continuing the puck-shaped housing example above, the housing may carry one or more first microphones near its first end and one or more second microphones in its second end. Then, when the housing is sitting on its first end, the NMD captures voice inputs using the one or more second microphones. Conversely, when the housing is sitting on its second end, the NMD captures voice inputs using the one or more first microphones.

Some cloud-based voice assistant services are triggered based on a wake word. In such examples, a voice input typically includes a wake word followed by an utterance comprising a user request. In practice, a wake word is typically a predetermined nonce word or phrase used to "wake up" an NMD and cause it to invoke a particular voice assistant service ("VAS") to interpret the intent of voice input in detected sound. For example, a user might speak the wake word "Alexa" to invoke the AMAZON® VAS, "Ok, Google" to invoke the GOOGLE® VAS, or "Hey, Siri" to invoke the APPLE® VAS, among other examples. In practice, a wake word may also be referred to as, for example, an activation-, trigger-, wakeup-word or -phrase, and may take the form of any suitable word, combination of words (e.g., a particular phrase), and/or some other audio cue.

To identify whether sound detected by the NMD contains a voice input that includes a particular wake word, NMDs often utilize a wake-word engine, which is typically onboard the NMD. The wake-word engine may be configured to identify (i.e., "spot" or "detect") a particular wake word in recorded audio using one or more identification algorithms. Such identification algorithms may include pattern recognition trained to detect the frequency and/or time domain patterns that speaking the wake word creates. This wake-word identification process is commonly referred to as "keyword spotting." In practice, to help facilitate keyword spotting, the NMD may buffer sound detected by a microphone of the NMD and then use the wake-word engine to process that buffered sound to determine whether a wake word is present in the recorded audio.

When a wake-word engine detects a wake word in recorded audio, the NMD may determine that a wake-word event (i.e., a "wake-word trigger") has occurred, which indicates that the NMD has detected sound that includes a potential voice input. The occurrence of the wake-word event typically causes the NMD to perform additional processes involving the detected sound. With a VAS wake-word engine, these additional processes may include extracting detected-sound data from a buffer, among other possible additional processes, such as outputting an alert (e.g., an audible chime and/or a light indicator) indicating that a wake word has been identified. Extracting the detected sound may include reading out and packaging a stream of the detected-sound according to a particular format and transmitting the packaged sound-data to an appropriate VAS for interpretation.

In turn, the VAS corresponding to the wake word that was identified by the wake-word engine receives the transmitted sound data from the NMD over a communication network. A VAS traditionally takes the form of a remote service implemented using one or more cloud servers configured to process voice inputs (e.g., AMAZON's ALEXA, APPLE's SIRI, MICROSOFT's CORTANA, GOOGLE'S ASSISTANT, etc.). In some instances, certain components and functionality of the VAS may be distributed across local and remote devices.

When a VAS receives detected-sound data, the VAS processes this data, which involves identifying the voice input and determining intent of words captured in the voice input. The VAS may then provide a response back to the NMD with some instruction according to the determined intent. Based on that instruction, the NMD may cause one or more smart devices to perform an action. For example, in accordance with an instruction from a VAS, an NMD may cause a playback device to play a particular song or an illumination device to turn on/off, among other examples. In some cases, an NMD, or a media system with NMDs (e.g., a media playback system with NMD-equipped playback devices) may be configured to interact with multiple VASes. In practice, the NMD may select one VAS over another based on the particular wake word identified in the sound detected by the NMD.

Within examples, local processing of a voice input may be trigged based on detection of one or more keywords in sound captured by the NMD. Example NMDs may include a local voice input engine to detect "local keywords" and generate events to process voice inputs when a local keyword is detected. These local keywords may take the form of a nonce keyword (e.g., "Hey, Sonos") or a keyword that invokes a command (referred to herein as a "command keyword"). A command keyword is a word or phrase that functions as a command itself, rather than being a nonce word that merely triggers a wake word event.

As noted above, a detected local keyword event may cause one or more subsequent actions, such as local natural language processing of a voice input. For instance, when a local voice input engine detects a local keyword in recorded audio, the NMD may determine that a local keyword event has occurred and responsively process the voice input locally using a local NLU. Processing the input may involve the local NLU determining an intent from one or more keywords in the voice input.

In some implementations, voice input processing via the local NLU may remain enabled when the voice input processing via the cloud-based VAS is enabled. In such embodiments, a user may target the cloud-based VAS for processing a voice input by speaking a VAS wake word. The user may target the local NLU for processing of the voice input by speaking a local wake word or by speaking a voice command without a VAS wake word. Alternatively, the NMD may disable voice input processing via the local NLU when voice input processing via the cloud-based VAS is enabled.

As noted above, example techniques relate to toggling a cloud-based VAS between enabled and disabled modes. An example implementation involves a network microphone device including one or more first microphones, one or more second microphones, a network interface, one or more processors, and a housing carrying the one or more first microphones, the one or more second microphones, the network interface, the one or more processors, and data storage having stored therein instructions executable by the one or more processors. The network microphone device detects that the housing is in a first orientation. After detecting that the housing is in the first orientation, the device enables a first mode. Enabling the first mode includes (i) disabling voice input processing via a cloud-based voice assistant service and (ii) enabling voice input processing via a local natural language unit. While the first mode is enabled, the network microphone device (i) captures sound data associated with a first voice input via the one or more first microphones and (ii) detects, via a local natural language unit, that the first voice input comprises sound data matching one or more keywords from a local natural language unit library of the local natural language unit. The network microphone device determines, via the local natural language unit, an intent of the first voice input based on at least one of the one or more keywords and performs a first command according to the determined intent of the first voice input. The network microphone device may detects that the housing is in a second orientation different than the first orientation. After detecting that the housing is in the second orientation, the network microphone device enables the second mode. Enabling the second mode includes enabling voice input processing via the cloud-based voice assistant service.

While some embodiments described herein may refer to functions performed by given actors, such as "users" and/or other entities, it should be understood that this description is for purposes of explanation only. The claims should not be interpreted to require action by any such example actor unless explicitly required by the language of the claims themselves.

Moreover, some functions are described herein as being performed "based on" or "in response to" another element or function. "Based on" should be understood that one element or function is related to another function or element. "In response to" should be understood that one element or function is a necessary result of another function or element. For the sake of brevity, functions are generally described as being based on another function when a functional link exists; however, such disclosure should be understood as disclosing either type of functional relationship.

II. Example Operation Environment

Figure 1B:
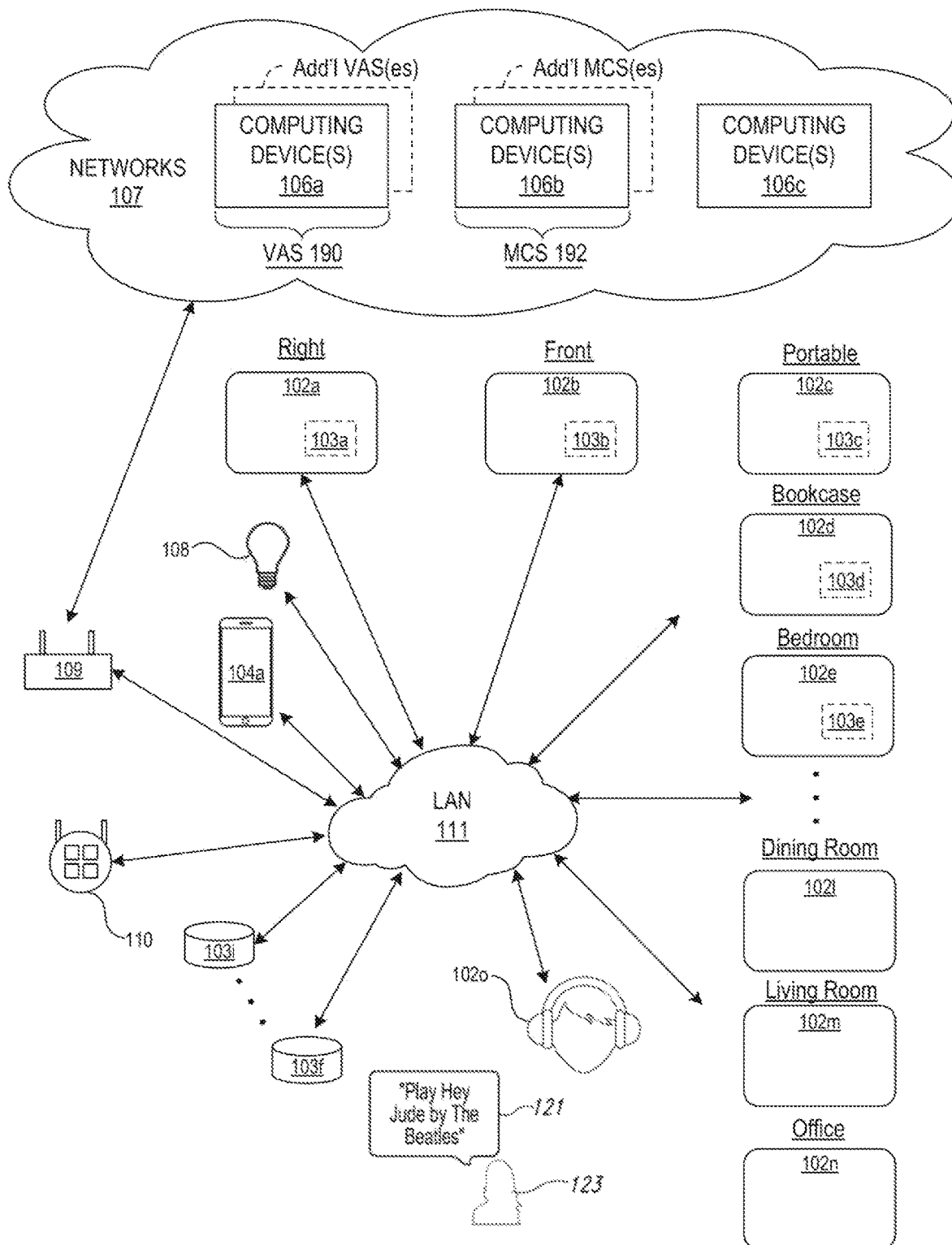
FIG. 1B is a schematic diagram of the media playback system of FIG. 1A and one or more networks.

FIGS. 1A and 1B illustrate an example configuration of a media playback system 100 (or "MPS 100") in which one or more embodiments disclosed herein may be implemented. Referring first to FIG. 1A, the MPS 100 as shown is associated with an example home environment having a plurality of rooms and spaces, which may be collectively referred to as a "home environment," "smart home," or "environment 101." The environment 101 comprises a household having several rooms, spaces, and/or playback zones, including a master bathroom 101a, a master bedroom 101b, (referred to herein as "Nick's Room"), a second bedroom 101c, a family room or den 101d, an office 101e, a living room 101f, a dining room 101g, a kitchen 101h, and an outdoor patio 101i.

While certain embodiments and examples are described below in the context of a home environment, the technologies described herein may be implemented in other types of environments. In some embodiments, for example, the MPS 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

Within these rooms and spaces, the MPS 100 includes one or more computing devices. Referring to FIGS. 1A and 1B together, such computing devices can include playback devices 102 (identified individually as playback devices 102a-102o), network microphone devices 103 (identified individually as "NMDs" 103a-102i), and controller devices 104a and 104b (collectively "controller devices 104"). Referring to FIG. 1B, the home environment may include additional and/or other computing devices, including local network devices, such as one or more smart illumination devices 108 (FIG. 1B), a smart thermostat 110, and a local computing device 105 (FIG. 1A). In embodiments described below, one or more of the various playback devices 102 may be configured as portable playback devices, while others may be configured as stationary playback devices. For example, the headphones 102*o* (FIG. 1B) are a portable playback device, while the playback device 102*d* on the bookcase may be a stationary device. As another example, the playback device 102*c* on the Patio may be a battery-powered device, which may allow it to be transported to various areas within the environment 101, and outside of the environment 101, when it is not plugged in to a wall outlet or the like.

With reference still to FIG. 1B, the various playback, network microphone, and controller devices 102, 103, and 104 and/or other network devices of the MPS 100 may be coupled to one another via point-to-point connections and/or over other connections, which may be wired and/or wireless, via a network 111, such as a LAN including a network router 109. For example, the playback device 102*j* in the Den 101*d* (FIG. 1A), which may be designated as the "Left" device, may have a point-to-point connection with the playback device 102*a*, which is also in the Den 101*d* and may be designated as the "Right" device. In a related embodiment, the Left playback device 102*j* may communicate with other network devices, such as the playback device 102*b*, which may be designated as the "Front" device, via a point-to-point connection and/or other connections via the NETWORK 111.

As further shown in FIG. 1B, the MPS 100 may be coupled to one or more remote computing devices 106 via a wide area network ("WAN") 107. In some embodiments, each remote computing device 106 may take the form of one or more cloud servers. The remote computing devices 106 may be configured to interact with computing devices in the environment 101 in various ways. For example, the remote computing devices 106 may be configured to facilitate streaming and/or controlling playback of media content, such as audio, in the home environment 101.

In some implementations, the various playback devices, NMDs, and/or controller devices 102-104 may be communicatively coupled to at least one remote computing device associated with a VAS and at least one remote computing device associated with a media content service ("MCS"). For instance, in the illustrated example of FIG. 1B, remote computing devices 106 are associated with a VAS 190 and remote computing devices 106*b* are associated with an MCS 192. Although only a single VAS 190 and a single MCS 192 are shown in the example of FIG. 1B for purposes of clarity, the MPS 100 may be coupled to multiple, different VASes and/or MCSes. In some implementations, VASes may be operated by one or more of AMAZON, GOOGLE, APPLE, MICROSOFT, SONOS or other voice assistant providers. In some implementations, MCSes may be operated by one or more of SPOTIFY, PANDORA, AMAZON MUSIC, or other media content services.

As further shown in FIG. 1B, the remote computing devices 106 further include remote computing device 106*c* configured to perform certain operations, such as remotely facilitating media playback functions, managing device and system status information, directing communications between the devices of the MPS 100 and one or multiple VASes and/or MCSes, among other operations. In one example, the remote computing devices 106*c* provide cloud servers for one or more SONOS Wireless HiFi Systems.

In various implementations, one or more of the playback devices 102 may take the form of or include an on-board (e.g., integrated) network microphone device. For example, the playback devices 102*a-e* include or are otherwise equipped with corresponding NMDs 103*a-e*, respectively. A playback device that includes or is equipped with an NMD may be referred to herein interchangeably as a playback device or an NMD unless indicated otherwise in the description. In some cases, one or more of the NMDs 103 may be a stand-alone device. For example, the NMDs 103*f* and 103*g* may be stand-alone devices. A stand-alone NMD may omit components and/or functionality that is typically included in a playback device, such as a speaker or related electronics. For instance, in such cases, a stand-alone NMD may not produce audio output or may produce limited audio output (e.g., relatively low-quality audio output).

The various playback and network microphone devices 102 and 103 of the MPS 100 may each be associated with a unique name, which may be assigned to the respective devices by a user, such as during setup of one or more of these devices. For instance, as shown in the illustrated example of FIG. 1B, a user may assign the name "Bookcase" to playback device 102*d* because it is physically situated on a bookcase. Similarly, the NMD 103*f* may be assigned the named "Island" because it is physically situated on an island countertop in the Kitchen 101*h* (FIG. 1A). Some playback devices may be assigned names according to a zone or room, such as the playback devices 102*e*, 102*l*, 102*m*, and 102*n*, which are named "Bedroom," "Dining Room," "Living Room," and "Office," respectively. Further, certain playback devices may have functionally descriptive names. For example, the playback devices 102*a* and 102*b* are assigned the names "Right" and "Front," respectively, because these two devices are configured to provide specific audio channels during media playback in the zone of the Den 101*d* (FIG. 1A). The playback device 102*c* in the Patio may be named portable because it is battery-powered and/or readily transportable to different areas of the environment 101. Other naming conventions are possible.

As discussed above, an NMD may detect and process sound from its environment, such as sound that includes background noise mixed with speech spoken by a person in the NMD's vicinity. For example, as sounds are detected by the NMD in the environment, the NMD may process the detected sound to determine if the sound includes speech that contains voice input intended for the NMD and ultimately a particular VAS. For example, the NMD may identify whether speech includes a wake word associated with a particular VAS.

In the illustrated example of FIG. 1B, the NMDs 103 are configured to interact with the VAS 190 over a network via the network 111 and the router 109. Interactions with the VAS 190 may be initiated, for example, when an NMD identifies in the detected sound a potential wake word. The identification causes a wake-word event, which in turn causes the NMD to begin transmitting detected-sound data to the VAS 190. In some implementations, the various local network devices 102-105 (FIG. 1A) and/or remote computing devices 106*c* of the MPS 100 may exchange various feedback, information, instructions, and/or related data with the remote computing devices associated with the selected VAS. Such exchanges may be related to or independent of transmitted messages containing voice inputs. In some embodiments, the remote computing device(s) and the MPS 100 may exchange data via communication paths as described herein and/or using a metadata exchange channel as described in U.S. application Ser. No. 15/438,749, filed Feb. 21, 2017, and titled "Voice Control of a Media Playback System," which is herein incorporated by reference in its entirety.

Upon receiving the stream of sound data, the VAS 190 determines if there is voice input in the streamed data from the NMD, and if so the VAS 190 will also determine an underlying intent in the voice input. The VAS 190 may next transmit a response back to the MPS 100, which can include transmitting the response directly to the NMD that caused the wake-word event. The response is typically based on the intent that the VAS 190 determined was present in the voice input. As an example, in response to the VAS 190 receiving a voice input with an utterance to "Play Hey Jude by The Beatles," the VAS 190 may determine that the underlying intent of the voice input is to initiate playback and further determine that intent of the voice input is to play the particular song "Hey Jude." After these determinations, the VAS 190 may transmit a command to a particular MCS 192 to retrieve content (i.e., the song "Hey Jude"), and that MCS 192, in turn, provides (e.g., streams) this content directly to the MPS 100 or indirectly via the VAS 190. In some implementations, the VAS 190 may transmit to the MPS 100 a command that causes the MPS 100 itself to retrieve the content from the MCS 192.

In certain implementations, NMDs may facilitate arbitration amongst one another when voice input is identified in speech detected by two or more NMDs located within proximity of one another. For example, the NMD-equipped playback device 102*d* in the environment 101 (FIG. 1A) is in relatively close proximity to the NMD-equipped Living Room playback device 102*m*, and both devices 102*d* and 102*m* may at least sometimes detect the same sound. In such cases, this may require arbitration as to which device is ultimately responsible for providing detected-sound data to the remote VAS. Examples of arbitrating between NMDs may be found, for example, in previously referenced U.S. application Ser. No. 15/438,749.

In certain implementations, an NMD may be assigned to, or otherwise associated with, a designated or default playback device that may not include an NMD. For example, the Island NMD 103*f* in the Kitchen 101*h* (FIG. 1A) may be assigned to the Dining Room playback device 102*l*, which is in relatively close proximity to the Island NMD 103*f*. In practice, an NMD may direct an assigned playback device to play audio in response to a remote VAS receiving a voice input from the NMD to play the audio, which the NMD might have sent to the VAS in response to a user speaking a command to play a certain song, album, playlist, etc. Additional details regarding assigning NMDs and playback devices as designated or default devices may be found, for example, in previously referenced U.S. patent application No.

Further aspects relating to the different components of the example MPS 100 and how the different components may interact to provide a user with a media experience may be found in the following sections. While discussions herein may generally refer to the example MPS 100, technologies described herein are not limited to applications within, among other things, the home environment described above. For instance, the technologies described herein may be useful in other home environment configurations comprising more or fewer of any of the playback, network microphone, and/or controller devices 102-104. For example, the technologies herein may be utilized within an environment having a single playback device 102 and/or a single NMD 103. In some examples of such cases, the NETWORK 111 (FIG. 1B) may be eliminated and the single playback device 102 and/or the single NMD 103 may communicate directly with the remote computing devices 106-*d*. In some embodiments, a telecommunication network (e.g., an LTE network, a 5G network, etc.) may communicate with the various playback, network microphone, and/or controller devices 102-104 independent of a LAN.

a. Example Playback & Network Microphone Devices

Figure 2A:
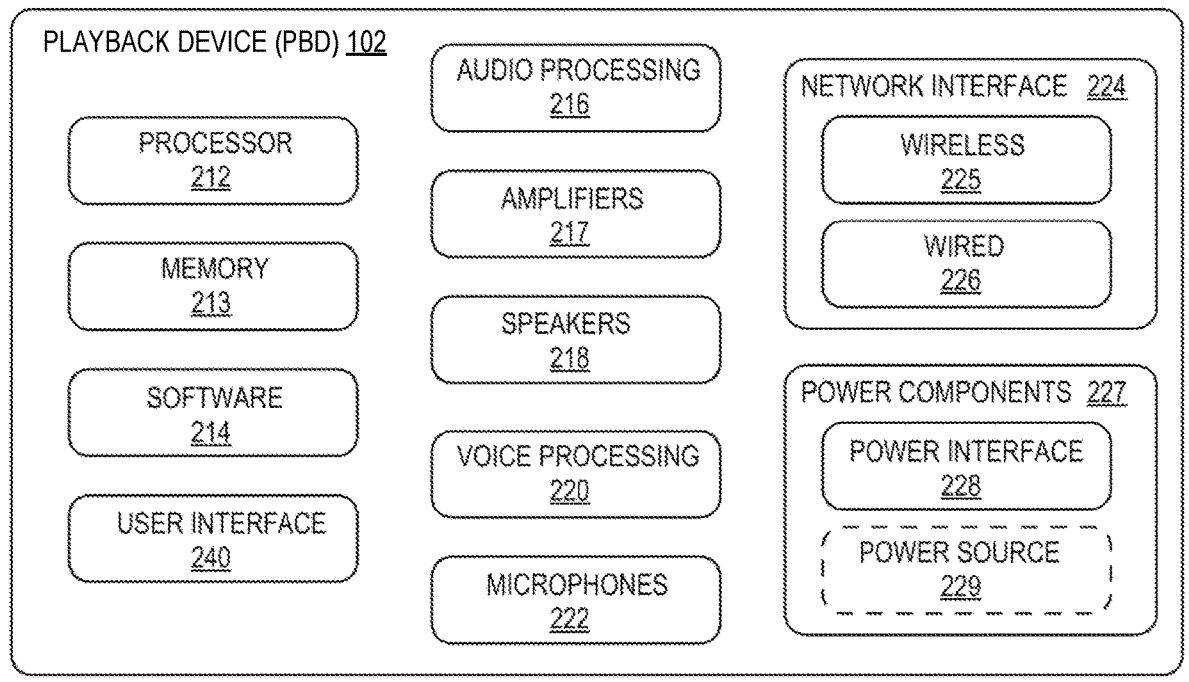
FIG. 2A is a functional block diagram of an example playback device.

FIG. 2A is a functional block diagram illustrating certain aspects of one of the playback devices 102 of the MPS 100 of FIGS. 1A and 1B. As shown, the playback device 102 includes various components, each of which is discussed in further detail below, and the various components of the playback device 102 may be operably coupled to one another via a system bus, communication network, or some other connection mechanism. In the illustrated example of FIG. 2A, the playback device 102 may be referred to as an "NMD-equipped" playback device because it includes components that support the functionality of an NMD, such as one of the NMDs 103 shown in FIG. 1A.

As shown, the playback device 102 includes at least one processor 212, which may be a clock-driven computing component configured to process input data according to instructions stored in memory 213. The memory 213 may be a tangible, non-transitory, computer-readable medium configured to store instructions that are executable by the processor 212. For example, the memory 213 may be data storage that can be loaded with software code 214 that is executable by the processor 212 to achieve certain functions.

In one example, these functions may involve the playback device 102 retrieving audio data from an audio source, which may be another playback device. In another example, the functions may involve the playback device 102 sending audio data, detected-sound data (e.g., corresponding to a voice input), and/or other information to another device on a network via at least one network interface 224. In yet another example, the functions may involve the playback device 102 causing one or more other playback devices to synchronously playback audio with the playback device 102. In yet a further example, the functions may involve the playback device 102 facilitating being paired or otherwise bonded with one or more other playback devices to create a multi-channel audio environment. Numerous other example functions are possible, some of which are discussed below.

As just mentioned, certain functions may involve the playback device 102 synchronizing playback of audio content with one or more other playback devices. During synchronous playback, a listener may not perceive time-delay differences between playback of the audio content by the synchronized playback devices. U.S. Pat. No. 8,234,395, filed on Apr. 4, 2004, and titled "System and method for synchronizing operations among a plurality of independently clocked digital data processing devices," which is hereby incorporated by reference in its entirety, provides in more detail some examples for audio playback synchronization among playback devices.

To facilitate audio playback, the playback device 102 includes audio processing components 216 that are generally configured to process audio prior to the playback device 102 rendering the audio. In this respect, the audio processing components 216 may include one or more digital-to-analog converters ("DAC"), one or more audio preprocessing components, one or more audio enhancement components, one or more digital signal processors ("DSPs"), and so on. In some implementations, one or more of the audio processing components 216 may be a subcomponent of the processor 212. In operation, the audio processing components 216 receive analog and/or digital audio and process and/or otherwise intentionally alter the audio to produce audio signals for playback.

The produced audio signals may then be provided to one or more audio amplifiers 217 for amplification and playback through one or more speakers 218 operably coupled to the amplifiers 217. The audio amplifiers 217 may include components configured to amplify audio signals to a level for driving one or more of the speakers 218.

Each of the speakers 218 may include an individual transducer (e.g., a "driver") or the speakers 218 may include a complete speaker system involving an enclosure with one or more drivers. A particular driver of a speaker 218 may include, for example, a subwoofer (e.g., for low frequencies), a mid-range driver (e.g., for middle frequencies), and/or a tweeter (e.g., for high frequencies). In some cases, a transducer may be driven by an individual corresponding audio amplifier of the audio amplifiers 217. In some implementations, a playback device may not include the speakers 218, but instead may include a speaker interface for connecting the playback device to external speakers. In certain embodiments, a playback device may include neither the speakers 218 nor the audio amplifiers 217, but instead may include an audio interface (not shown) for connecting the playback device to an external audio amplifier or audio-visual receiver.

In addition to producing audio signals for playback by the playback device 102, the audio processing components 216 may be configured to process audio to be sent to one or more other playback devices, via the network interface 224, for playback. In example scenarios, audio content to be processed and/or played back by the playback device 102 may be received from an external source, such as via an audio line-in interface (e.g., an auto-detecting 3.5 mm audio line-in connection) of the playback device 102 (not shown) or via the network interface 224, as described below.

As shown, the at least one network interface 224, may take the form of one or more wireless interfaces 225 and/or one or more wired interfaces 226. A wireless interface may provide network interface functions for the playback device 102 to wirelessly communicate with other devices (e.g., other playback device(s), NMD(s), and/or controller device(s)) in accordance with a communication protocol (e.g., any wireless standard including IEEE 802.11a, 802.11b, 802.11g, 802.11n, 802.11ac, 802.15, 4G mobile communication standard, and so on). A wired interface may provide network interface functions for the playback device 102 to communicate over a wired connection with other devices in accordance with a communication protocol (e.g., IEEE 802.3). While the network interface 224 shown in FIG. 2A include both wired and wireless interfaces, the playback device 102 may in some implementations include only wireless interface(s) or only wired interface(s).

In general, the network interface 224 facilitates data flow between the playback device 102 and one or more other devices on a data network. For instance, the playback device 102 may be configured to receive audio content over the data network from one or more other playback devices, network devices within a LAN, and/or audio content sources over a WAN, such as the Internet. In one example, the audio content and other signals transmitted and received by the playback device 102 may be transmitted in the form of digital packet data comprising an Internet Protocol (IP)-based source address and IP-based destination addresses. In such a case, the network interface 224 may be configured to parse the digital packet data such that the data destined for the playback device 102 is properly received and processed by the playback device 102.

As shown in FIG. 2A, the playback device 102 also includes voice processing components 220 that are operably coupled to one or more microphones 222. The microphones 222 are configured to detect sound (i.e., acoustic waves) in the environment of the playback device 102, which is then provided to the voice processing components 220. More specifically, each microphone 222 is configured to detect sound and convert the sound into a digital or analog signal representative of the detected sound, which can then cause the voice processing component 220 to perform various functions based on the detected sound, as described in greater detail below. In one implementation, the microphones 222 are arranged as an array of microphones (e.g., an array of six microphones). In some implementations, the playback device 102 includes more than six microphones (e.g., eight microphones or twelve microphones) or fewer than six microphones (e.g., four microphones, two microphones, or a single microphones).

In operation, the voice-processing components 220 are generally configured to detect and process sound received via the microphones 222, identify potential voice input in the detected sound, and extract detected-sound data to enable a VAS, such as the VAS 190 (FIG. 1B), to process voice input identified in the detected-sound data. The voice processing components 220 may include one or more analog-to-digital converters, an acoustic echo canceller ("AEC"), a spatial processor (e.g., one or more multi-channel Wiener filters, one or more other filters, and/or one or more beam former components), one or more buffers (e.g., one or more circular buffers), one or more wake-word engines, one or more voice extractors, and/or one or more speech processing components (e.g., components configured to recognize a voice of a particular user or a particular set of users associated with a household), among other example voice processing components. In example implementations, the voice processing components 220 may include or otherwise take the form of one or more DSPs or one or more modules of a DSP. In this respect, certain voice processing components 220 may be configured with particular parameters (e.g., gain and/or spectral parameters) that may be modified or otherwise tuned to achieve particular functions. In some implementations, one or more of the voice processing components 220 may be a subcomponent of the processor 212.

As further shown in FIG. 2A, the playback device 102 also includes power components 227. The power components 227 include at least an external power source interface 228, which may be coupled to a power source (not shown) via a power cable or the like that physically connects the playback device 102 to an electrical outlet or some other external power source. Other power components may include, for example, transformers, converters, and like components configured to format electrical power.

In some implementations, the power components 227 of the playback device 102 may additionally include an internal power source 229 (e.g., one or more batteries) configured to power the playback device 102 without a physical connection to an external power source. When equipped with the internal power source 229, the playback device 102 may operate independent of an external power source. In some such implementations, the external power source interface 228 may be configured to facilitate charging the internal power source 229. As discussed before, a playback device comprising an internal power source may be referred to herein as a "portable playback device." On the other hand, a playback device that operates using an external power source may be referred to herein as a "stationary playback device," although such a device may in fact be moved around a home or other environment.

The playback device 102 further includes a user interface 240 that may facilitate user interactions independent of or in conjunction with user interactions facilitated by one or more of the controller devices 104. In various embodiments, the user interface 240 includes one or more physical buttons and/or supports graphical interfaces provided on touch sensitive screen(s) and/or surface(s), among other possibilities, for a user to directly provide input. The user interface 240 may further include one or more of lights (e.g., LEDs) and the speakers to provide visual and/or audio feedback to a user.

Figure 2B:
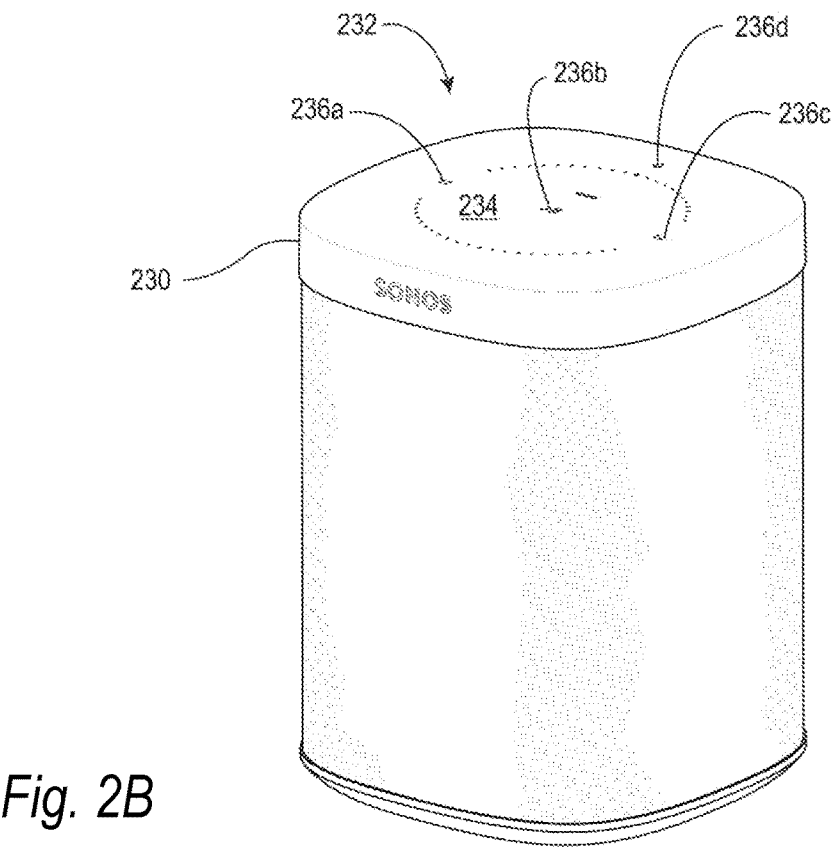
FIG. 2B is an isometric diagram of an example housing of the playback device of FIG. 2A.

As an illustrative example, FIG. 2B shows an example housing 230 of the playback device 102 that includes a user interface in the form of a control area 232 at a top portion 234 of the housing 230. The control area 232 includes buttons 236a-c for controlling audio playback, volume level, and other functions. The control area 232 also includes a button 236d for toggling the microphones 222 to either an on state or an off state.

As further shown in FIG. 2B, the control area 232 is at least partially surrounded by apertures formed in the top portion 234 of the housing 230 through which the microphones 222 (not visible in FIG. 2B) receive the sound in the environment of the playback device 102. The microphones 222 may be arranged in various positions along and/or within the top portion 234 or other areas of the housing 230 so as to detect sound from one or more directions relative to the playback device 102.

By way of illustration, SONOS, Inc. presently offers (or has offered) for sale certain playback devices that may implement certain of the embodiments disclosed herein, including a "PLAY:1," "PLAY:3," "PLAY:5," "PLAYBAR," "CONNECT:AMP," "PLAYBASE," "BEAM," "CONNECT," and "SUB." Any other past, present, and/or future playback devices may additionally or alternatively be used to implement the playback devices of example embodiments disclosed herein. Additionally, it should be understood that a playback device is not limited to the examples illustrated in FIG. 2A or 2B or to the SONOS product offerings. For example, a playback device may include, or otherwise take the form of, a wired or wireless headphone set, which may operate as a part of the MPS 100 via a network interface or the like. In another example, a playback device may include or interact with a docking station for personal mobile media playback devices. In yet another example, a playback device may be integral to another device or component such as a television, a lighting fixture, or some other device for indoor or outdoor use.

Figure 2C:
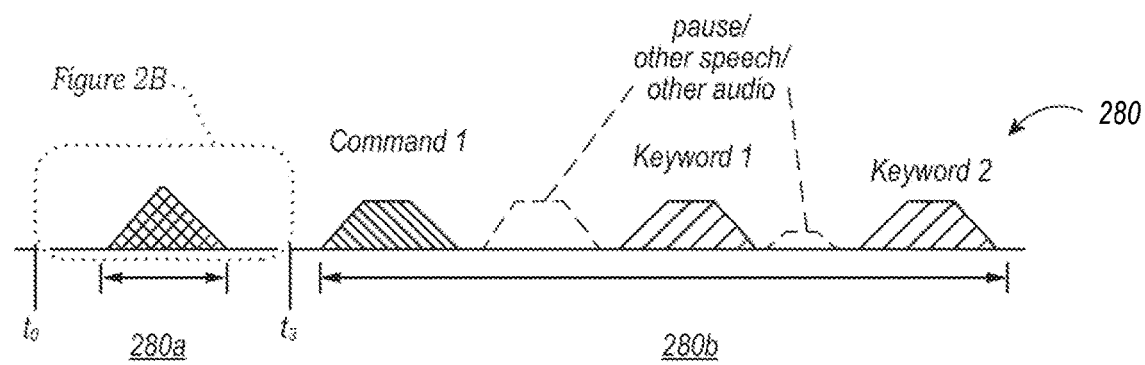
FIG. 2C is a diagram of an example voice input.

FIG. 2C is a diagram of an example voice input 280 that may be processed by an NMD or an NMD-equipped playback device. The voice input 280 may include a keyword portion 280a and an utterance portion 280b. The keyword portion 280a may include a wake word or a command keyword. In the case of a wake word, the keyword portion 280a corresponds to detected sound that caused a wake-word The utterance portion 280b corresponds to detected sound that potentially comprises a user request following the keyword portion 280a. An utterance portion 280b can be processed to identify the presence of any words in detected-sound data by the NMD in response to the event caused by the keyword portion 280a. In various implementations, an underlying intent can be determined based on the words in the utterance portion 280b. In certain implementations, an underlying intent can also be based or at least partially based on certain words in the keyword portion 280a, such as when keyword portion includes a command keyword. In any case, the words may correspond to one or more commands, as well as a certain command and certain keywords. A keyword in the voice utterance portion 280b may be, for example, a word identifying a particular device or group in the MPS 100. For instance, in the illustrated example, the keywords in the voice utterance portion 280b may be one or more words identifying one or more zones in which the music is to be played, such as the Living Room and the Dining Room (FIG. 1A). In some cases, the utterance portion 280b may include additional information, such as detected pauses (e.g., periods of non-speech) between words spoken by a user, as shown in FIG. 2C. The pauses may demarcate the locations of separate commands, keywords, or other information spoke by the user within the utterance portion 280b.

Based on certain command criteria, the NMD and/or a remote VAS may take actions as a result of identifying one or more commands in the voice input. Command criteria may be based on the inclusion of certain keywords within the voice input, among other possibilities. Additionally, or alternatively, command criteria for commands may involve identification of one or more control-state and/or zone-state variables in conjunction with identification of one or more particular commands. Control-state variables may include, for example, indicators identifying a level of volume, a queue associated with one or more devices, and playback state, such as whether devices are playing a queue, paused, etc. Zone-state variables may include, for example, indicators identifying which, if any, zone players are grouped.

In some implementations, the MPS 100 is configured to temporarily reduce the volume of audio content that it is playing upon detecting a certain keyword, such as a wake word, in the keyword portion 280a. The MPS 100 may restore the volume after processing the voice input 280. Such a process can be referred to as ducking, examples of which are disclosed in U.S. patent application Ser. No. 15/438,749, incorporated by reference herein in its entirety.

Figure 2D:
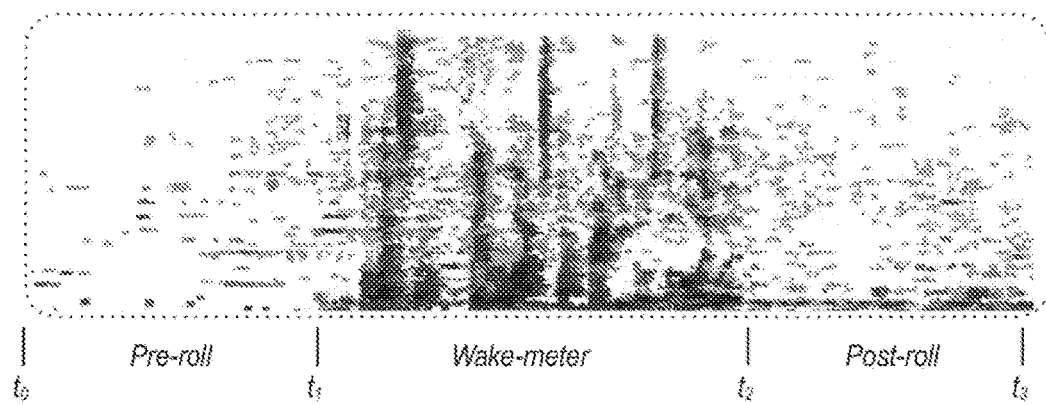
FIG. 2D is a graph depicting an example sound specimen in accordance with aspects of the disclosure.

FIG. 2D shows an example sound specimen. In this example, the sound specimen corresponds to the sound-data stream (e.g., one or more audio frames) associated with a spotted wake word or command keyword in the keyword portion 280a of FIG. 2A. As illustrated, the example sound specimen comprises sound detected in an NMD's environment (i) immediately before a wake or command word was spoken, which may be referred to as a pre-roll portion (between times $t_0$ and $t_1$), (ii) while a wake or command word was spoken, which may be referred to as a wake-meter portion (between times $t_1$ and $t_2$), and/or (iii) after the wake or command word was spoken, which may be referred to as a post-roll portion (between times $t_2$ and $t_3$). Other sound specimens are also possible. In various implementations, aspects of the sound specimen can be evaluated according to an acoustic model which aims to map mels/spectral features to phonemes in a given language model for further processing. For example, automatic speech recognition (ASR) may include such mapping for command-keyword detection. Wake-word detection engines, by contrast, may be precisely tuned to identify a specific wake-word, and a downstream action of invoking a VAS (e.g., by targeting only nonce words in the voice input processed by the playback device).

ASR for command keyword detection may be tuned to accommodate a wide range of keywords (e.g., 5, 10, 100, 1,000, 10,000 keywords). Command keyword detection, in contrast to wake-word detection, may involve feeding ASR output to an onboard, local NLU which together with the ASR determine when command word events have occurred. In some implementations described below, the local NLU may determine an intent based on one or more other keywords in the ASR output produced by a particular voice input. In these or other implementations, a playback device may act on a detected command keyword event only when the playback devices determines that certain conditions have been met, such as environmental conditions (e.g., low background noise).

b. Example Playback Device Configurations

FIGS. 3A-3E show example configurations of playback devices. Referring first to FIG. 3A, in some example instances, a single playback device may belong to a zone. For example, the playback device 102c (FIG. 1A) on the Patio may belong to Zone A. In some implementations described below, multiple playback devices may be "bonded" to form a "bonded pair," which together form a single zone. For example, the playback device 102f (FIG. 1A) named "Bed 1" in FIG. 3A may be bonded to the playback device 102g (FIG. 1A) named "Bed 2" in FIG. 3A to form Zone B. Bonded playback devices may have different playback responsibilities (e.g., channel responsibilities). In another implementation described below, multiple playback devices may be merged to form a single zone. For example, the playback device 102d named "Bookcase" may be merged with the playback device 102m named "Living Room" to form a single Zone C. The merged playback devices 102d and 102m may not be specifically assigned different playback responsibilities. That is, the merged playback devices 102d and 102m may, aside from playing audio content in synchrony, each play audio content as they would if they were not merged.

For purposes of control, each zone in the MPS 100 may be represented as a single user interface ("UI") entity. For example, as displayed by the controller devices 104, Zone A may be provided as a single entity named "Portable," Zone B may be provided as a single entity named "Stereo," and Zone C may be provided as a single entity named "Living Room."

In various embodiments, a zone may take on the name of one of the playback devices belonging to the zone. For example, Zone C may take on the name of the Living Room device 102m (as shown). In another example, Zone C may instead take on the name of the Bookcase device 102d. In a further example, Zone C may take on a name that is some combination of the Bookcase device 102d and Living Room device 102m. The name that is chosen may be selected by a user via inputs at a controller device 104. In some embodiments, a zone may be given a name that is different than the device(s) belonging to the zone. For example, Zone B in FIG. 3A is named "Stereo" but none of the devices in Zone B have this name. In one aspect, Zone B is a single UI entity representing a single device named "Stereo," composed of constituent devices "Bed 1" and "Bed 2." In one implementation, the Bed 1 device may be playback device 102f in the master bedroom 101h (FIG. 1A) and the Bed 2 device may be the playback device 102g also in the master bedroom 101h (FIG. 1A).

As noted above, playback devices that are bonded may have different playback responsibilities, such as playback responsibilities for certain audio channels. For example, as shown in FIG. 3B, the Bed 1 and Bed 2 devices 102f and 102g may be bonded so as to produce or enhance a stereo effect of audio content. In this example, the Bed 1 playback device 102f may be configured to play a left channel audio component, while the Bed 2 playback device 102g may be configured to play a right channel audio component. In some implementations, such stereo bonding may be referred to as "pairing."

Additionally, playback devices that are configured to be bonded may have additional and/or different respective speaker drivers. As shown in FIG. 3C, the playback device 102b named "Front" may be bonded with the playback device 102k named "SUB." The Front device 102b may render a range of mid to high frequencies, and the SUB device 102k may render low frequencies as, for example, a subwoofer. When unbonded, the Front device 102b may be configured to render a full range of frequencies. As another example, FIG. 3D shows the Front and SUB devices 102b and 102k further bonded with Right and Left playback devices 102a and 102j, respectively. In some implementations, the Right and Left devices 102a and 102j may form surround or "satellite" channels of a home theater system. The bonded playback devices 102a, 102b, 102j, and 102k may form a single Zone D (FIG. 3A).

In some implementations, playback devices may also be "merged." In contrast to certain bonded playback devices, playback devices that are merged may not have assigned playback responsibilities, but may each render the full range of audio content that each respective playback device is capable of. Nevertheless, merged devices may be represented as a single UI entity (i.e., a zone, as discussed above). For instance, FIG. 3E shows the playback devices 102d and 102m in the Living Room merged, which would result in these devices being represented by the single UI entity of Zone C. In one embodiment, the playback devices 102d and 102m may playback audio in synchrony, during which each outputs the full range of audio content that each respective playback device 102d and 102m is capable of rendering.

In some embodiments, a stand-alone NMD may be in a zone by itself. For example, the NMD 103h from FIG. 1A is named "Closet" and forms Zone I in FIG. 3A. An NMD may also be bonded or merged with another device so as to form a zone. For example, the NMD device 103f named "Island" may be bonded with the playback device 102i Kitchen, which together form Zone F, which is also named "Kitchen." Additional details regarding assigning NMDs and playback devices as designated or default devices may be found, for example, in previously referenced U.S. patent application Ser. No. 15/438,749. In some embodiments, a stand-alone NMD may not be assigned to a zone.

Zones of individual, bonded, and/or merged devices may be arranged to form a set of playback devices that playback audio in synchrony. Such a set of playback devices may be referred to as a "group," "zone group," "synchrony group," or "playback group." In response to inputs provided via a controller device 104, playback devices may be dynamically grouped and ungrouped to form new or different groups that synchronously play back audio content. For example, referring to FIG. 3A, Zone A may be grouped with Zone B to form a zone group that includes the playback devices of the two zones. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Grouped and bonded devices are example types of associations between portable and stationary playback devices that may be caused in response to a trigger event, as discussed above and described in greater detail below.

In various implementations, the zones in an environment may be assigned a particular name, which may be the default name of a zone within a zone group or a combination of the names of the zones within a zone group, such as "Dining Room+Kitchen," as shown in FIG. 3A. In some embodiments, a zone group may be given a unique name selected by a user, such as "Nick's Room," as also shown in FIG. 3A. The name "Nick's Room" may be a name chosen by a user over a prior name for the zone group, such as the room name "Master Bedroom."

Referring back to FIG. 2A, certain data may be stored in the memory 213 as one or more state variables that are periodically updated and used to describe the state of a playback zone, the playback device(s), and/or a zone group associated therewith. The memory 213 may also include the data associated with the state of the other devices of the MPS 100, which may be shared from time to time among the devices so that one or more of the devices have the most recent data associated with the system.

In some embodiments, the memory 213 of the playback device 102 may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, in FIG. 1A, identifiers associated with the Patio may indicate that the Patio is the only playback device of a particular zone and not in a zone group. Identifiers associated with the Living Room may indicate that the Living Room is not grouped with other zones but includes bonded playback devices 102a, 102b, 102j, and 102k. Identifiers associated with the Dining Room may indicate that the Dining Room is part of Dining Room+Kitchen group and that devices 103f and 102i are bonded. Identifiers associated with the Kitchen may indicate the same or similar information by virtue of the Kitchen being part of the Dining Room+Kitchen zone group. Other example zone variables and identifiers are described below.

In yet another example, the MPS 100 may include variables or identifiers representing other associations of zones and zone groups, such as identifiers associated with Areas, as shown in FIG. 3A. An Area may involve a cluster of zone groups and/or zones not within a zone group. For instance, FIG. 3A shows a first area named "First Area" and a second area named "Second Area." The First Area includes zones and zone groups of the Patio, Den, Dining Room, Kitchen, and Bathroom. The Second Area includes zones and zone groups of the Bathroom, Nick's Room, Bedroom, and Living Room. In one aspect, an Area may be used to invoke a cluster of zone groups and/or zones that share one or more zones and/or zone groups of another cluster. In this respect, such an Area differs from a zone group, which does not share a zone with another zone group. Further examples of techniques for implementing Areas may be found, for example, in U.S. application Ser. No. 15/682,506, filed Aug. 21, 2017, and titled "Room Association Based on Name," and U.S. Pat. No. 8,483,853, filed Sep. 11, 2007, and titled "Controlling and manipulating groupings in a multi-zone media system." Each of these applications is incorporated herein by reference in its entirety. In some embodiments, the MPS 100 may not implement Areas, in which case the system may not store variables associated with Areas.

The memory 213 may be further configured to store other data. Such data may pertain to audio sources accessible by the playback device 102 or a playback queue that the playback device (or some other playback device(s)) may be associated with. In embodiments described below, the memory 213 is configured to store a set of command data for selecting a particular VAS when processing voice inputs. During operation, one or more playback zones in the environment of FIG. 1A may each be playing different audio content. For instance, the user may be grilling in the Patio zone and listening to hip hop music being played by the playback device 102c, while another user may be preparing food in the Kitchen zone and listening to classical music being played by the playback device 102i. In another example, a playback zone may play the same audio content in synchrony with another playback zone.

For instance, the user may be in the Office zone where the playback device 102n is playing the same hip-hop music that is being playing by playback device 102c in the Patio zone. In such a case, playback devices 102c and 102n may be playing the hip-hop in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the MPS 100 may be dynamically modified. As such, the MPS 100 may support numerous configurations. For example, if a user physically moves one or more playback devices to or from a zone, the MPS 100 may be reconfigured to accommodate the change(s). For instance, if the user physically moves the playback device 102c from the Patio zone to the Office zone, the Office zone may now include both the playback devices 102c and 102n. In some cases, the user may pair or group the moved playback device 102c with the Office zone and/or rename the players in the Office zone using, for example, one of the controller devices 104 and/or voice input. As another example, if one or more playback devices 102 are moved to a particular space in the home environment that is not already a playback zone, the moved playback device(s) may be renamed or associated with a playback zone for the particular space.

Further, different playback zones of the MPS 100 may be dynamically combined into zone groups or split up into individual playback zones. For example, the Dining Room zone and the Kitchen zone may be combined into a zone group for a dinner party such that playback devices 102i and 102l may render audio content in synchrony. As another example, bonded playback devices in the Den zone may be split into (i) a television zone and (ii) a separate listening zone. The television zone may include the Front playback device 102b. The listening zone may include the Right, Left, and SUB playback devices 102a, 102j, and 102k, which may be grouped, paired, or merged, as described above. Splitting the Den zone in such a manner may allow one user to listen to music in the listening zone in one area of the living room space, and another user to watch the television in another area of the living room space. In a related example, a user may utilize either of the NMD 103a or 103b (FIG. 1B) to control the Den zone before it is separated into the television zone and the listening zone. Once separated, the listening zone may be controlled, for example, by a user in the vicinity of the NMD 103a, and the television zone may be controlled, for example, by a user in the vicinity of the NMD 103b. As described above, however, any of the NMDs 103 may be configured to control the various playback and other devices of the MPS 100.

c. Example Controller Devices

FIG. 4 is a functional block diagram illustrating certain aspects of a selected one of the controller devices 104 of the MPS 100 of FIG. 1A. Such controller devices may also be referred to herein as a "control device" or "controller." The controller device shown in FIG. 4 may include components that are generally similar to certain components of the network devices described above, such as a processor 412, memory 413 storing program software 414, at least one network interface 424, and one or more microphones 422. In one example, a controller device may be a dedicated controller for the MPS 100. In another example, a controller device may be a network device on which media playback system controller application software may be installed, such as for example, an iPhone™, iPad™ or any other smart phone, tablet, or network device (e.g., a networked computer such as a PC or Mac™).

The memory 413 of the controller device 104 may be configured to store controller application software and other data associated with the MPS 100 and/or a user of the system 100. The memory 413 may be loaded with instructions in software 414 that are executable by the processor 412 to achieve certain functions, such as facilitating user access, control, and/or configuration of the MPS 100. The controller device 104 is configured to communicate with other network devices via the network interface 424, which may take the form of a wireless interface, as described above.

In one example, system information (e.g., such as a state variable) may be communicated between the controller device 104 and other devices via the network interface 424. For instance, the controller device 104 may receive playback zone and zone group configurations in the MPS 100 from a playback device, an NMD, or another network device. Likewise, the controller device 104 may transmit such system information to a playback device or another network device via the network interface 424. In some cases, the other network device may be another controller device.

The controller device 104 may also communicate playback device control commands, such as volume control and audio playback control, to a playback device via the network interface 424. As suggested above, changes to configurations of the MPS 100 may also be performed by a user using the controller device 104. The configuration changes may include adding/removing one or more playback devices to/from a zone, adding/removing one or more zones to/from a zone group, forming a bonded or merged player, separating one or more playback devices from a bonded or merged player, among others.

As shown in FIG. 4, the controller device 104 also includes a user interface 440 that is generally configured to facilitate user access and control of the MPS 100. The user interface 440 may include a touch-screen display or other physical interface configured to provide various graphical controller interfaces, such as the controller interfaces 540a and 540b shown in FIGS. 5A and 5B. Referring to FIGS. 5A and 5B together, the controller interfaces 540a and 540b includes a playback control region 542, a playback zone region 543, a playback status region 544, a playback queue region 546, and a sources region 548. The user interface as shown is just one example of an interface that may be provided on a network device, such as the controller device shown in FIG. 4, and accessed by users to control a media playback system, such as the MPS 100. Other user interfaces of varying formats, styles, and interactive sequences may alternatively be implemented on one or more network devices to provide comparable control access to a media playback system.

The playback control region 542 (FIG. 5A) may include selectable icons (e.g., by way of touch or by using a cursor) that, when selected, cause playback devices in a selected playback zone or zone group to play or pause, fast forward, rewind, skip to next, skip to previous, enter/exit shuffle mode, enter/exit repeat mode, enter/exit cross fade mode, etc. The playback control region 542 may also include selectable icons that, when selected, modify equalization settings and/or playback volume, among other possibilities.

The playback zone region 543 (FIG. 5B) may include representations of playback zones within the MPS 100. The playback zones regions 543 may also include a representation of zone groups, such as the Dining Room+Kitchen zone group, as shown.

In some embodiments, the graphical representations of playback zones may be selectable to bring up additional selectable icons to manage or configure the playback zones in the MPS 100, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the MPS 100 to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface are also possible. The representations of playback zones in the playback zone region 543 (FIG. 5B) may be dynamically updated as playback zone or zone group configurations are modified.

The playback status region 544 (FIG. 5A) may include graphical representations of audio content that is presently being played, previously played, or scheduled to play next in the selected playback zone or zone group. The selected playback zone or zone group may be visually distinguished on a controller interface, such as within the playback zone region 543 and/or the playback status region 544. The graphical representations may include track title, artist name, album name, album year, track length, and/or other relevant information that may be useful for the user to know when controlling the MPS 100 via a controller interface.

The playback queue region 546 may include graphical representations of audio content in a playback queue associated with the selected playback zone or zone group. In some embodiments, each playback zone or zone group may be associated with a playback queue comprising information corresponding to zero or more audio items for playback by the playback zone or zone group. For instance, each audio item in the playback queue may comprise a uniform resource identifier (URI), a uniform resource locator (URL), or some other identifier that may be used by a playback device in the playback zone or zone group to find and/or retrieve the audio item from a local audio content source or a networked audio content source, which may then be played back by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streamed audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue or may be associated with a new playback queue that is empty or contains audio items from the playback queue associated with the established zone group before the established zone group was ungrouped. Similarly, the resulting second playback zone may be re-associated with the previous second playback queue or may be associated with a new playback queue that is empty or contains audio items from the playback queue associated with the established zone group before the established zone group was ungrouped. Other examples are also possible.

With reference still to FIGS. 5A and 5B, the graphical representations of audio content in the playback queue region 646 (FIG. 5A) may include track titles, artist names, track lengths, and/or other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device. Playback of such a playback queue may involve one or more playback devices playing back media items of the queue, perhaps in sequential or random order.

The sources region 548 may include graphical representations of selectable audio content sources and/or selectable voice assistants associated with a corresponding VAS. The VASes may be selectively assigned. In some examples, multiple VASes, such as AMAZON's Alexa, MICROSOFT's Cortana, etc., may be invokable by the same NMD. In some embodiments, a user may assign a VAS exclusively to one or more NMDs. For example, a user may assign a first VAS to one or both of the NMDs 102a and 102b in the Living Room shown in FIG. 1A, and a second VAS to the NMD 103f in the Kitchen. Other examples are possible.

d. Example Audio Content Sources

The audio sources in the sources region 548 may be audio content sources from which audio content may be retrieved and played by the selected playback zone or zone group. One or more playback devices in a zone or zone group may be configured to retrieve for playback audio content (e.g., according to a corresponding URI or URL for the audio content) from a variety of available audio content sources. In one example, audio content may be retrieved by a playback device directly from a corresponding audio content source (e.g., via a line-in connection). In another example, audio content may be provided to a playback device over a network via one or more other playback devices or network devices. As described in greater detail below, in some embodiments audio content may be provided by one or more media content services.

Example audio content sources may include a memory of one or more playback devices in a media playback system such as the MPS 100 of FIG. 1, local music libraries on one or more network devices (e.g., a controller device, a network-enabled personal computer, or a networked-attached storage ("NAS")), streaming audio services providing audio content via the Internet (e.g., cloud-based music services), or audio sources connected to the media playback system via a line-in input connection on a playback device or network device, among other possibilities.

In some embodiments, audio content sources may be added or removed from a media playback system such as the MPS 100 of FIG. 1A. In one example, an indexing of audio items may be performed whenever one or more audio content sources are added, removed, or updated. Indexing of audio items may involve scanning for identifiable audio items in all folders/directories shared over a network accessible by playback devices in the media playback system and generating or updating an audio content database comprising metadata (e.g., title, artist, album, track length, among others) and other associated information, such as a URI or URL for each identifiable audio item found. Other examples for managing and maintaining audio content sources may also be possible.

Figure 6:
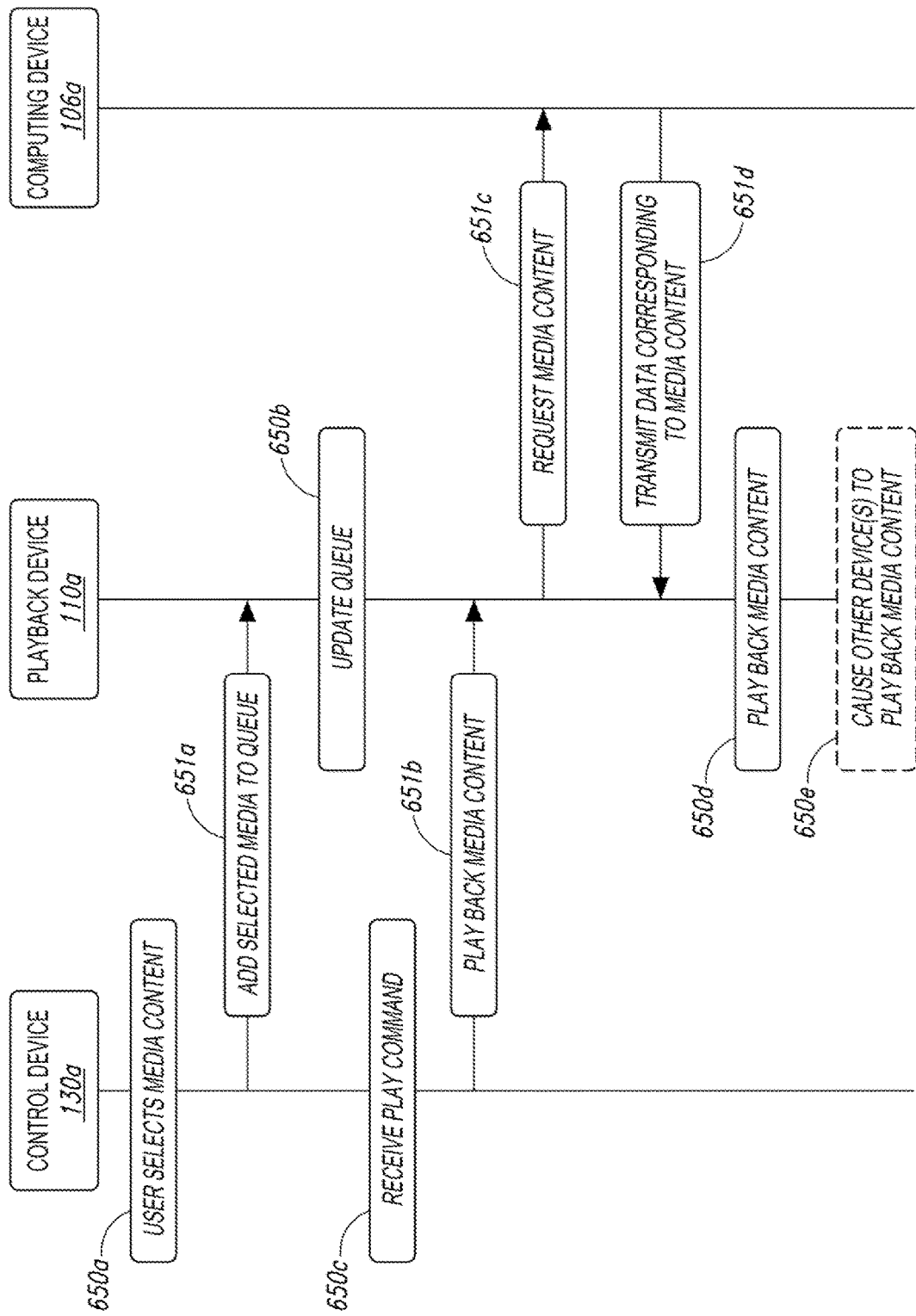
FIG. 6 is a message flow diagram of a media playback system.

FIG. 6 is a message flow diagram illustrating data exchanges between devices of the MPS 100. At step 650a, the MPS 100 receives an indication of selected media content (e.g., one or more songs, albums, playlists, podcasts, videos, stations) via the control device 104. The selected media content can comprise, for example, media items stored locally on or more devices connected to the media playback system and/or media items stored on one or more media service servers (one or more of the remote computing devices 106 of FIG. 1B). In response to receiving the indication of the selected media content, the control device 104 transmits a message 651a to the playback device 102 (FIGS. 1A-1B) to add the selected media content to a playback queue on the playback device 102.

At step 650b, the playback device 102 receives the message 651a and adds the selected media content to the playback queue for play back.

At step 650c, the control device 104 receives input corresponding to a command to play back the selected media content. In response to receiving the input corresponding to the command to play back the selected media content, the control device 104 transmits a message 651b to the playback device 102 causing the playback device 102 to play back the selected media content. In response to receiving the message 651b, the playback device 102 transmits a message 651c to the computing device 106 requesting the selected media content. The computing device 106, in response to receiving the message 651c, transmits a message 651d comprising data (e.g., audio data, video data, a URL, a URI) corresponding to the requested media content.

At step 650d, the playback device 102 receives the message 651d with the data corresponding to the requested media content and plays back the associated media content.

At step 650e, the playback device 102 optionally causes one or more other devices to play back the selected media content. In one example, the playback device 102 is one of a bonded zone of two or more players. The playback device 102 can receive the selected media content and transmit all or a portion of the media content to other devices in the bonded zone. In another example, the playback device 102 is a coordinator of a group and is configured to transmit and receive timing information from one or more other devices in the group. The other one or more devices in the group can receive the selected media content from the computing device 106, and begin playback of the selected media content in response to a message from the playback device 102 such that all of the devices in the group play back the selected media content in synchrony.

III. Example Network Microphone Device

Figure 7A:
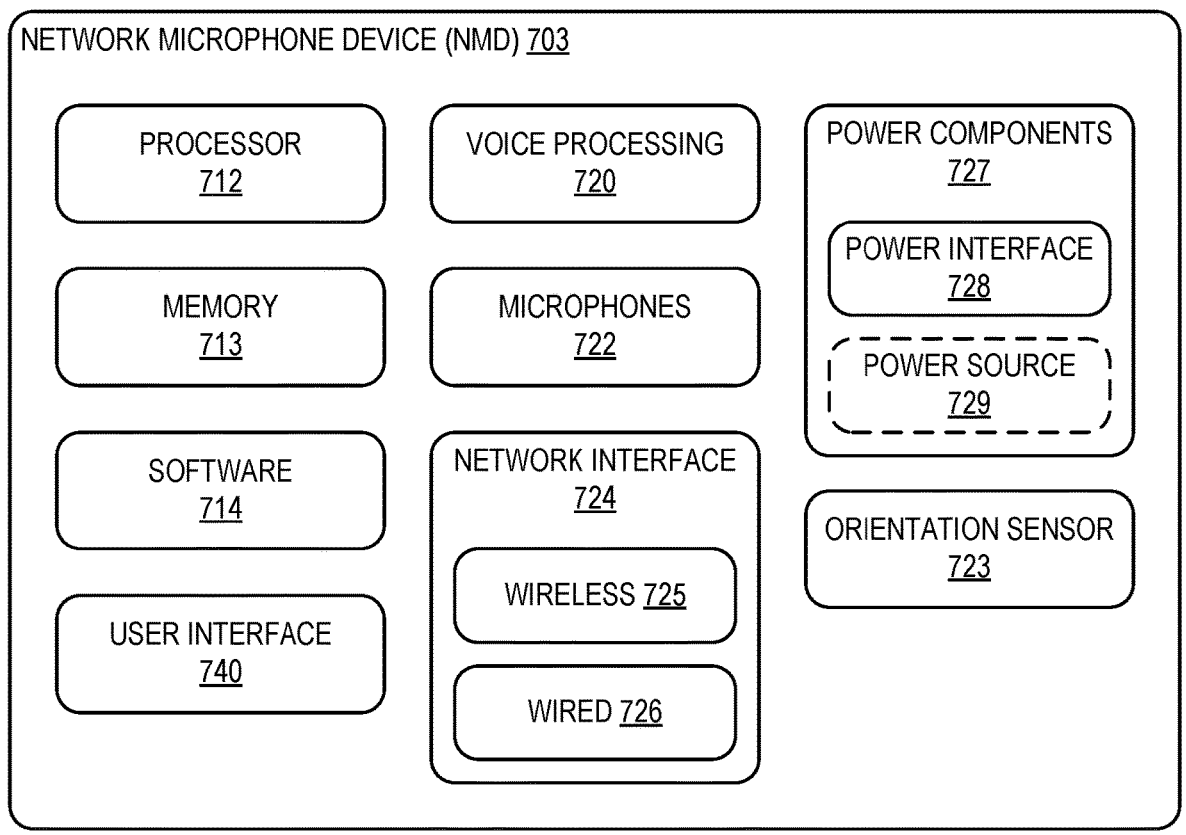
FIG. 7A is a functional block diagram of an example network microphone device.

FIG. 7A is a functional block diagram illustrating certain aspects of an example network microphone device (NMD) 703. Generally, the NMD 703 may be similar to the network microphone device(s) 103 illustrated in FIGS. 1A and 1B. As shown, the NMD 703 includes various components, each of which is discussed in further detail below. Many of these components are similar to the playback device 102 of FIG. 2A. In contrast to the NMD-equipped playback device of FIG. 2A, however, the NMD 703 is not designed for audio content playback and therefore may exclude audio processing components 216, amplifiers 217, and/or speakers 218 or may include relatively less capable versions of these components. The various components of the NMD 703 may be operably coupled to one another via a system bus, communication network, or some other connection mechanism.

As shown, the NMD 703 includes at least one processor 712, which may be a clock-driven computing component configured to process input data according to instructions stored in memory 713. The memory 713 may be a tangible, non-transitory, computer-readable medium configured to store instructions that are executable by the processor 712. For example, the memory 713 may be data storage that can be loaded with software code 714 that is executable by the processor 712 to achieve certain functions.

The at least one network interface 724 may take the form of one or more wireless interfaces 725 and/or one or more wired interfaces 726. The wireless interface 725 may provide network interface functions for the NMD 703 to wirelessly communicate with other devices (e.g., playback device(s) 102, other NMD(s) 103, and/or controller device(s) 104) in accordance with a communication protocol (e.g., any wireless standard including IEEE 802.11a, 802.11b, 802.11g, 802.11n, 802.11ac, 802.15, 4G mobile communication standard, and so on). The wired interface 726 may provide network interface functions for the NMD 703 to communicate over a wired connection with other devices in accordance with a communication protocol (e.g., IEEE 802.3). While the network interface 724 shown in FIG. 7A includes both wired and wireless interfaces, the playback device 102 may in various implementations include only wireless interface(s) or only wired interface(s).

As shown in FIG. 7A, the NMD 703 also includes voice processing components 720 that are operably coupled to microphones 722. The microphones 722 are configured to detect sound (i.e., acoustic waves) in the environment of the NMD 703, which is then provided to the voice processing components 720. More specifically, the microphones 722 are configured to detect sound and convert the sound into a digital or analog signal representative of the detected sound, which can then cause the voice processing component 720 to perform various functions based on the detected sound, as described in greater detail below. In one implementation, the microphones 722 are arranged as one or more arrays of microphones (e.g., an array of six microphones). In some implementations, the NMD 703 includes more than six microphones (e.g., eight microphones or twelve microphones) or fewer than six microphones (e.g., four microphones, two microphones, or a single microphone).

In operation, similar to the voice-processing components 220 of the NMD-equipped playback device 102 the voice-processing components 720 are generally configured to detect and process sound received via the microphones 722, identify potential voice input in the detected sound, and extract detected-sound data to enable processing of the voice input by a cloud-based VAS, such as the VAS 190 (FIG. 1B), or a local NLU. The voice processing components 720 may include one or more analog-to-digital converters, an acoustic echo canceller ("AEC"), a spatial processor, one or more buffers (e.g., one or more circular buffers), one or more wake-word engines, one or more voice extractors, and/or one or more speech processing components (e.g., components configured to recognize a voice of a particular user or a particular set of users associated with a household), among other example voice processing components. In example implementations, the voice processing components 720 may include or otherwise take the form of one or more DSPs or one or more modules of a DSP. In some implementations, one or more of the voice processing components 720 may be a subcomponent of the processor 712.

The NMD 703 also includes one or more orientation sensors 723 configured to detect an orientation of the NMD 703. The orientation sensor(s) 723 may include one or more accelerometers, one or more gyroscopes, and/or a magnetometer facilitate detecting an orientation of the NMD 703. Various implementations may implement any suitable orientation detection techniques.

As further shown in FIG. 2A, the NMD 703 also includes power components 727. The power components 727 include at least an external power source interface 728, which may be coupled to a power source (not shown) via a power cable or the like that physically connects the NMD 703 to an electrical outlet or some other external power source. Other power components may include, for example, transformers, converters, and like components configured to format electrical power.

In some implementations, the power components 727 of the NMD 703 may additionally include an internal power source 729 (e.g., one or more batteries) configured to power the NMD 703 without a physical connection to an external power source. When equipped with the internal power source 729, the NMD 703 may operate independent of an external power source. In some such implementations, the external power source interface 728 may be configured to facilitate charging the internal power source 729. As discussed before, a NMD comprising an internal power source may be referred to herein as a "portable NMD." On the other hand, a NMD that operates using an external power source may be referred to herein as a "stationary NMD," although such a device may in fact be moved around a home or other environment (e.g., to be connected to different power outlets of a home or other building).

The NMD 703 further includes a user interface 740 that may facilitate user interactions independent of or in conjunction with user interactions facilitated by one or more of the controller devices 104. In various embodiments, the user interface 740 includes one or more physical buttons and/or supports graphical interfaces provided on touch sensitive screen(s) and/or surface(s), among other possibilities, for a user to directly provide input. The user interface 740 may further include one or more of lights (e.g., LEDs) and the speakers to provide visual and/or audio feedback to a user.

Figure 7B:
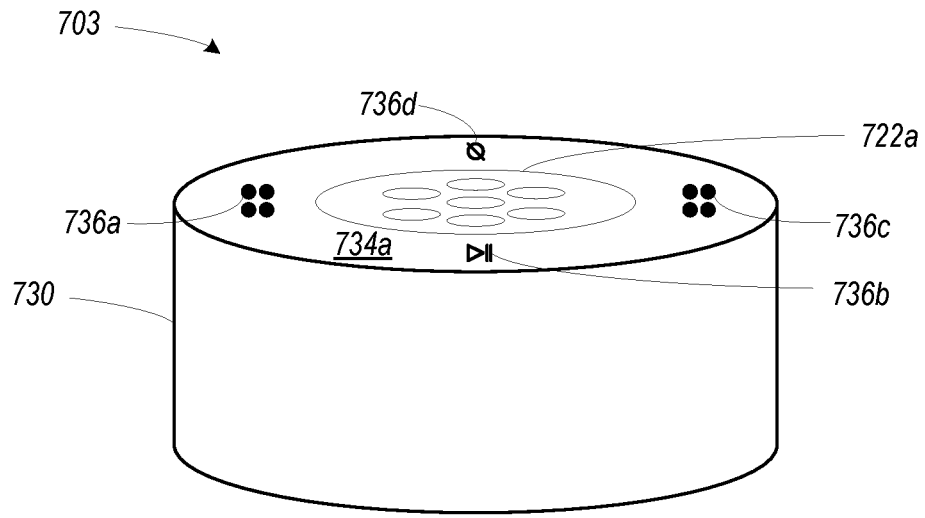
FIG. 7B is an isometric diagram of the example network microphone device in a first orientation.

As an illustrative example, FIG. 7B shows an example housing 730 of the NMD 703 in a first orientation with a top portion 734a of the housing 730 oriented upwards. The top portion 734a of the housing 730 includes a user interface 740a carried on the top portion 734a of the housing 730. The user interface 740a includes buttons 736a-736c for controlling audio playback, volume level, and other functions. The user interface 740a also includes a button 736d for toggling the microphones 722a to either an on state or an off state.

As further shown in FIG. 7B, apertures are formed in the top portion 734a of the housing 730 through which one or more first microphones 722a receive sound in the environment of the NMD 703. The microphones 722a may be arranged in various positions along and/or within the top portion 734a or other areas of the housing 730 so as to detect sound from one or more directions relative to the NMD 703.

Figure 7C:
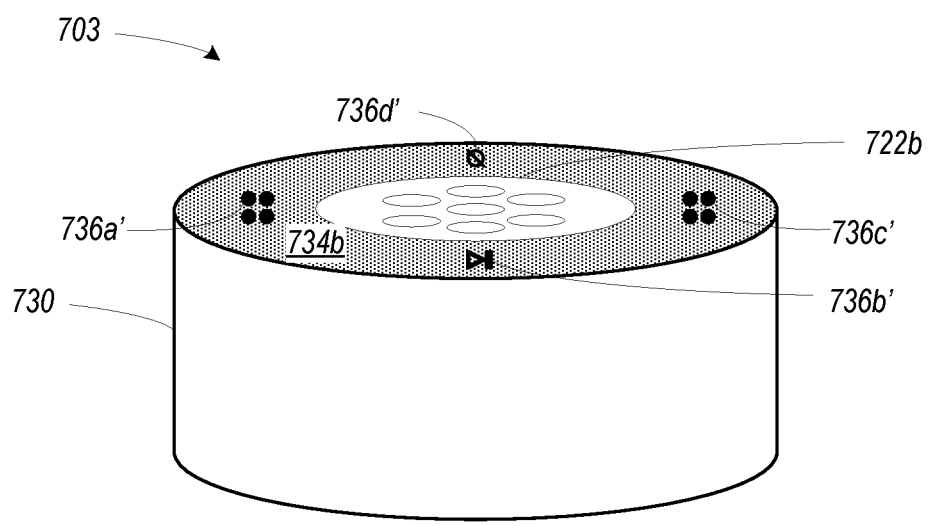
FIG. 7C is an isometric diagram of the example network microphone device in a second orientation.

FIG. 7C shows the example housing 730 of the NMD 703 in a second orientation with a bottom portion 734b of the housing 730 oriented upwards. Similar to the top portion 734a, the bottom portion 734b of the housing 730 includes a user interface 740b carried on the bottom portion 734a of the housing 730. The user interface 740b includes buttons 736a'-736c' for controlling audio playback, volume level, and other functions. The user interface 740b also includes a button 736d' for toggling the microphones 722b to either an on state or an off state.

Similar to the top portion 734a, apertures are formed in the bottom portion 734b of the housing 730 through which one or more second microphones 722b receive sound in the environment of the NMD 703. The microphones 722b may be arranged in various positions along and/or within the bottom portion 734b or other areas of the housing 730 so as to detect sound from one or more directions relative to the NMD 703.

Figure 7D:
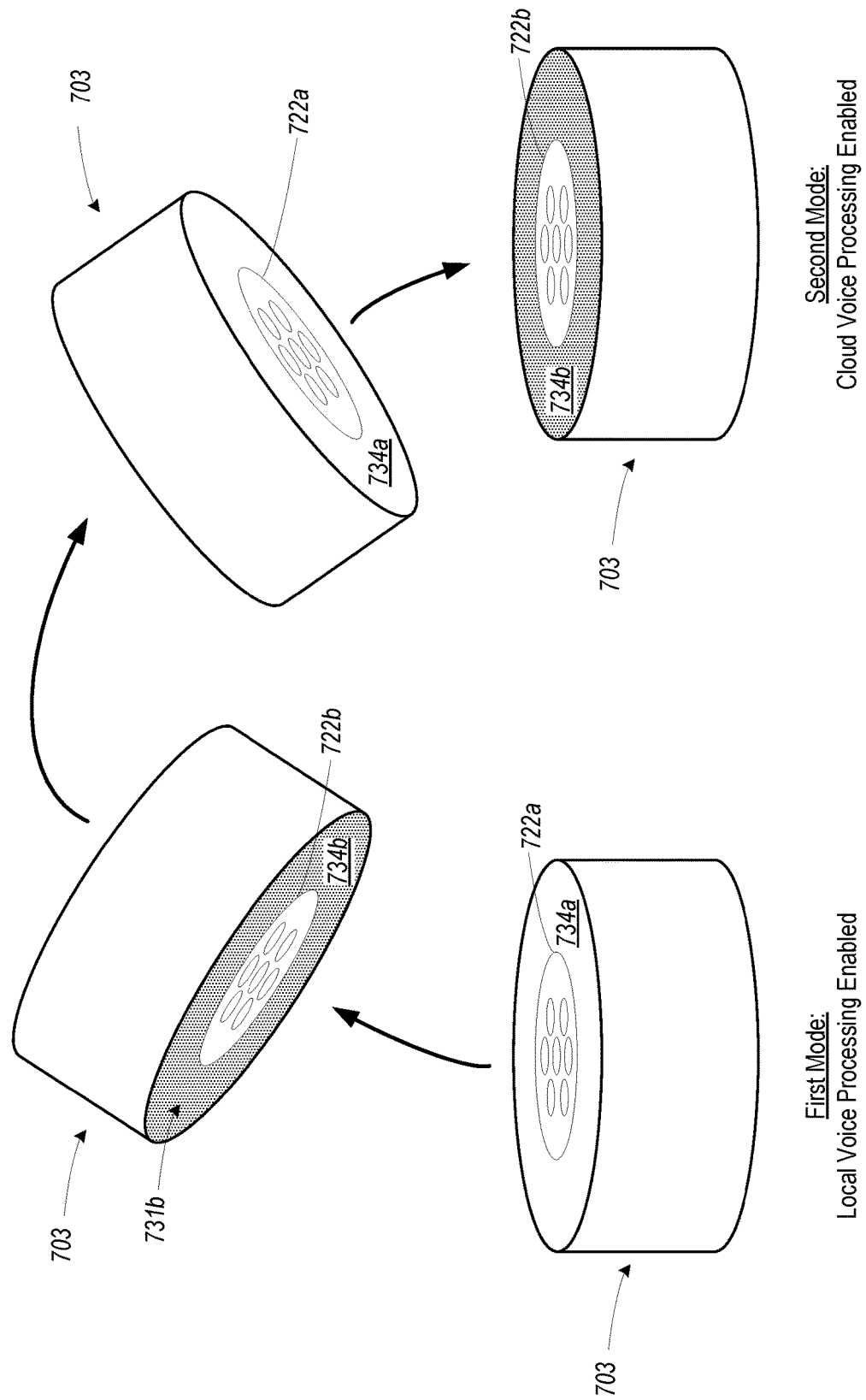
FIG. 7D is an isometric diagram illustrating the example network microphone device transitioning from the first orientation to the second orientation.

FIG. 7D illustrates the NMD 703 being re-oriented from the first orientation to the second orientation by flipping over the housing 730. In operation, the orientation sensor(s) 723 detect that the housing 730 is in the first orientation or the second orientation. When the orientation sensor(s) 723 detect that the housing 730 is in the first orientation, the NMD 703 enables a first mode associated with local processing of voice inputs detected via the microphone(s) 722a. Conversely, when the orientation sensor(s) 723 detect that the housing 730 is in the second orientation, the NMD 703 enables a second mode associated with cloud processing of voice inputs detected via the microphone(s) 722b.

More particularly, in the first mode, voice input processing via cloud-based voice assistant services is disabled. Instead, voice inputs are processed locally on via a local natural language unit. Since voice inputs are not sent to any cloud-based VAS in the first mode, operation in the first mode may enhance user privacy.

In contrast, in the second mode, voice input processing via cloud-based voice assistant services is enabled. In this mode, voice inputs directed to a cloud-based VAS (e.g., via a VAS wake word) are send to the cloud-based VAS for processing. This second mode allows the user to take advantage of the relatively-greater capabilities of cloud-based voice assistant services relative to processing via a local NLU. At the same time, in some implementations, the local NLU remains enabled in the second mode, which allows users to direct certain voice inputs for local processing (e.g., via a local wake word).

In various examples, the top portion 734a and bottom portion of the 734b may be implemented using different colors, patterns, textures, or other visual differences. Visual differences between the top portion 734a and bottom portion of the 734b of the housing 730 may assist a user in determining whether the NMD 703 is operating in the first mode (with the top portion 734a facing upwards) or operating in the second mode (with the bottom portion 734b facing upwards), especially from across a room.

Within example implementations, enabling the first mode or the second mode may involve enabling or disabling the microphones 722. In particular, while the NMD 730 is in the first orientation, the microphones 722a are enabled and the microphones 722b are disabled. Conversely, while the NMD 730 is operating in the second mode, the microphones 722a are disabled and the microphones 722b are disabled. This may prevent the microphones 722 on the bottom of the housing 730 (i.e., either the microphones 722a or 722b, depending on the orientation) from receiving muffled or otherwise distorted audio.

Further, in example implementations, the NMD may include a control to toggle between the first mode and the second mode. For instance, the housing 730 of the NMD 703 may include a physical switch or other hardware control to toggle between the first mode and the second mode. Alternatively, a control on a graphical user interface on a control device (e.g., the controller interfaces 540 of the control device 104) or voice inputs to a voice user interface may be used to toggle between the first mode and the second mode. Such a control may be implemented in addition to a toggle based on device orientation or as an alternative to the toggle based on device orientation.

Figure 7E:
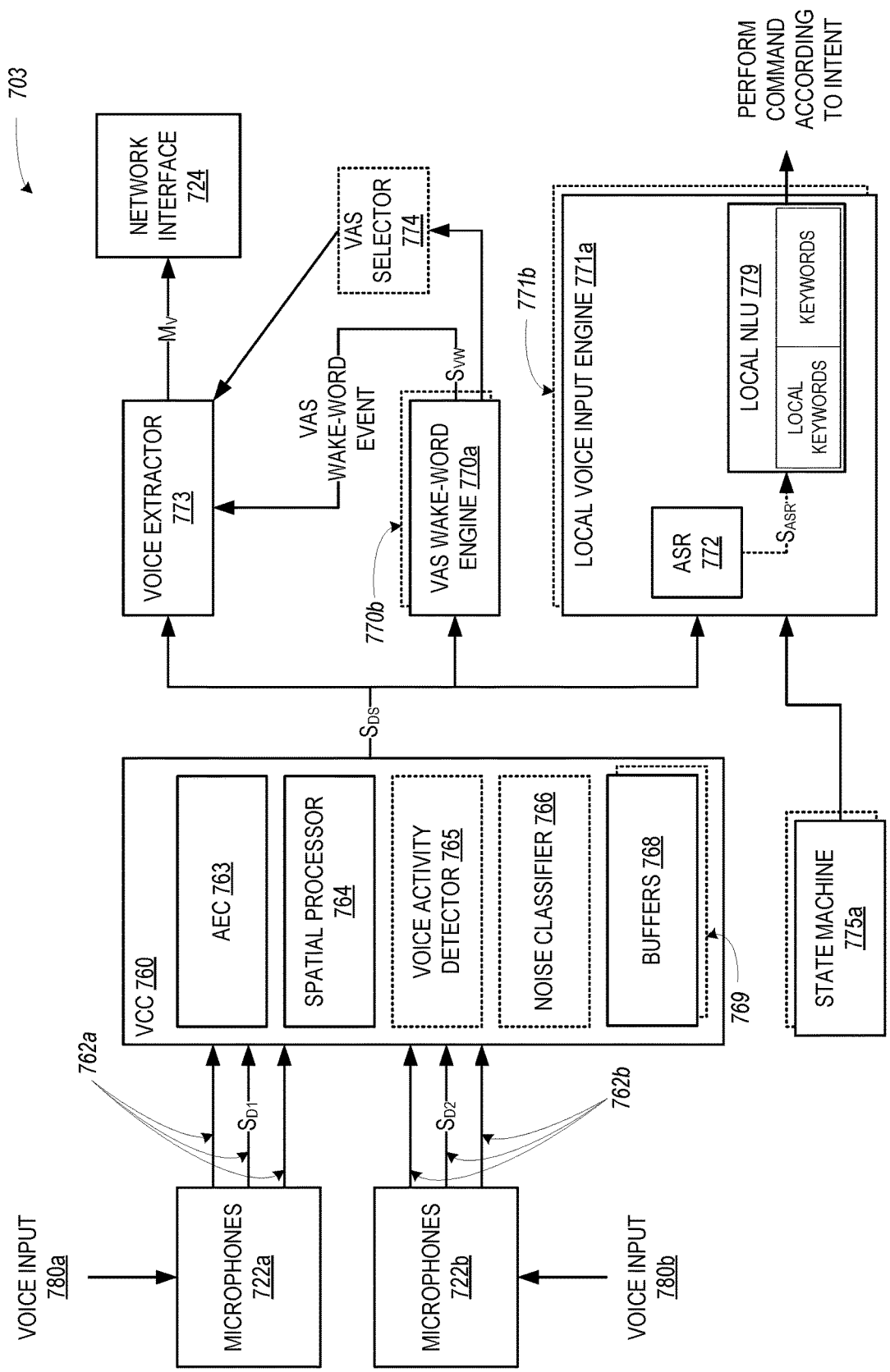
FIG. 7E is a functional block diagram of certain components of the example network microphone device in accordance with aspects of the disclosure.

FIG. 7E is a functional block diagram showing aspects of an NMD 703 configured in accordance with embodiments of the disclosure. As described in more detail below, the NMD 703 is configured to handle certain voice inputs locally while in a first mode (and possibly also in the second mode), without necessarily transmitting data representing the voice input to a VAS. The NMD 703 is also configured to process other voice inputs using a voice assistant service while the NMD 703 is in a second mode.

Referring to the FIG. 7E, the NMD 703 includes voice capture components ("VCC") 760, a VAS wake-word engine 770a, and a voice extractor 773. The VAS wake-word engine 770a and the voice extractor 773 are operably coupled to the VCC 760. The NMD 703a further a local voice input engine 771a operably coupled to the VCC 760.

The NMD 703 further includes microphones 722a and 722b (referred to collectively as the microphones 722). The microphones 722 of the NMD 703a are configured to provide detected sound, $S_D$, from the environment of the NMD 703 to the VCC 760. The detected sound $S_D$ may take the form of one or more analog or digital signals. In example implementations, the detected sound $S_D$ may be composed of a plurality signals associated with respective channels 762a or 762b (referred to collectively as channels 762) that are fed to the VCC 760.

Each channel 762 may correspond to a particular microphone 722. For example, an NMD having six microphones may have six corresponding channels. Each channel of the detected sound $S_D$ may bear certain similarities to the other channels but may differ in certain regards, which may be due to the position of the given channel's corresponding microphone relative to the microphones of other channels. For example, one or more of the channels of the detected sound $S_D$ may have a greater signal to noise ratio ("SNR") of speech to background noise than other channels.

As further shown in FIG. 7E, the VCC 760 includes an AEC 763, a spatial processor 764, and one or more buffers 768. In operation, the AEC 763 receives the detected sound $S_D$ and filters or otherwise processes the sound to suppress echoes and/or to otherwise improve the quality of the detected sound $S_D$. That processed sound may then be passed to the spatial processor 764.

The spatial processor 764 is typically configured to analyze the detected sound $S_D$ and identify certain characteristics, such as a sound's amplitude (e.g., decibel level), frequency spectrum, directionality, etc. In one respect, the spatial processor 764 may help filter or suppress ambient noise in the detected sound $S_D$ from potential user speech based on similarities and differences in the constituent channels 762 of the detected sound $S_D$, as discussed above. As one possibility, the spatial processor 764 may monitor metrics that distinguish speech from other sounds. Such metrics can include, for example, energy within the speech band relative to background noise and entropy within the speech band-a measure of spectral structure-which is typically lower in speech than in most common background noise. In some implementations, the spatial processor 764 may be configured to determine a speech presence probability, examples of such functionality are disclosed in U.S. patent application Ser. No. 15/984,073, filed May 18, 2018, titled "Linear Filtering for Noise-Suppressed Speech Detection," which is incorporated herein by reference in its entirety.

In operation, the one or more buffers 768—one or more of which may be part of or separate from the memory 713 (FIG. 7A)—capture data corresponding to the detected sound $S_D$. More specifically, the one or more buffers 768 capture detected-sound data that was processed by the upstream AEC 764 and spatial processor 766.

The network interface 724 may then provide this information to a remote server that may be associated with the MPS 100. In one aspect, the information stored in the additional buffer 769 does not reveal the content of any speech but instead is indicative of certain unique features of the detected sound itself. In a related aspect, the information may be communicated between computing devices, such as the various computing devices of the MPS 100, without necessarily implicating privacy concerns. In practice, the MPS 100 can use this information to adapt and fine-tune voice processing algorithms, including sensitivity tuning as discussed below. In some implementations the additional buffer may comprise or include functionality similar to lookback buffers disclosed, for example, in U.S. patent application Ser. No. 15/989,715, filed May 25, 2018, titled "Determining and Adapting to Changes in Microphone Performance of Playback Devices"; U.S. patent application Ser. No. 16/141,875, filed Sep. 25, 2018, titled "Voice Detection Optimization Based on Selected Voice Assistant Service"; and U.S. patent application Ser. No. 16/138,111, filed Sep. 21, 2018, titled "Voice Detection Optimization Using Sound Metadata," which are incorporated herein by reference in their entireties.

In any event, the detected-sound data forms a digital representation (i.e., sound-data stream), $S_{DS}$, of the sound detected by the microphones 720. In practice, the sound-data stream $S_{DS}$ may take a variety of forms. As one possibility, the sound-data stream $S_{DS}$ may be composed of frames, each of which may include one or more sound samples. The frames may be streamed (i.e., read out) from the one or more buffers 768 for further processing by downstream components, such as the VAS wake-word engines 770 and the voice extractor 773 of the NMD 703.

In some implementations, at least one buffer 768 captures detected-sound data utilizing a sliding window approach in which a given amount (i.e., a given window) of the most recently captured detected-sound data is retained in the at least one buffer 768 while older detected-sound data is overwritten when it falls outside of the window. For example, at least one buffer 768 may temporarily retain 20 frames of a sound specimen at given time, discard the oldest frame after an expiration time, and then capture a new frame, which is added to the 19 prior frames of the sound specimen.

In practice, when the sound-data stream $S_{DS}$ is composed of frames, the frames may take a variety of forms having a variety of characteristics. As one possibility, the frames may take the form of audio frames that have a certain resolution (e.g., 16 bits of resolution), which may be based on a sampling rate (e.g., 44,100 Hz). Additionally, or alternatively, the frames may include information corresponding to a given sound specimen that the frames define, such as metadata that indicates frequency response, power input level, SNR, microphone channel identification, and/or other information of the given sound specimen, among other examples. Thus, in some embodiments, a frame may include a portion of sound (e.g., one or more samples of a given sound specimen) and metadata regarding the portion of sound. In other embodiments, a frame may only include a portion of sound (e.g., one or more samples of a given sound specimen) or metadata regarding a portion of sound.

In any case, downstream components of the NMD 703 may process the sound-data stream $S_{DS}$. For instance, the VAS wake-word engines 770 are configured to apply one or more identification algorithms to the sound-data stream $S_{DS}$ (e.g., streamed sound frames) to spot potential wake words in the detected-sound $S_D$. This process may be referred to as automatic speech recognition. The VAS wake-word engine 770a and command keyword engine 771a apply different identification algorithms corresponding to their respective wake words, and further generate different events based on detecting a wake word in the detected-sound $S_D$.

Example wake word detection algorithms accept audio as input and provide an indication of whether a wake word is present in the audio. Many first- and third-party wake word detection algorithms are known and commercially available. For instance, operators of a voice service may make their algorithm available for use in third-party devices. Alternatively, an algorithm may be trained to detect certain wake-words.

For instance, when the VAS wake-word engine 770a detects a potential VAS wake word, the VAS work-word engine 770a provides an indication of a "VAS wake-word event" (also referred to as a "VAS wake-word trigger"). In the illustrated example of FIG. 7A, the VAS wake-word engine 770a outputs a signal Svw that indicates the occurrence of a VAS wake-word event to the voice extractor 773.

In multi-VAS implementations, the NMD 703 may include a VAS selector 774 (shown in dashed lines) that is generally configured to direct extraction by the voice extractor 773 and transmission of the sound-data stream $S_{DS}$ to the appropriate VAS when a given wake-word is identified by a particular wake-word engine (and a corresponding wake-word trigger), such as the VAS wake-word engine 770a and at least one additional VAS wake-word engine 770b (shown in dashed lines). In such implementations, the NMD 703 may include multiple, different VAS wake-word engines and/or voice extractors, each supported by a respective VAS.

Similar to the discussion above, each VAS wake-word engine 770 may be configured to receive as input the sound-data stream $S_{DS}$ from the one or more buffers 768 and apply identification algorithms to cause a wake-word trigger for the appropriate VAS. Thus, as one example, the VAS wake-word engine 770a may be configured to identify the wake word "Alexa" and cause the NMD 703a to invoke the AMAZON VAS when "Alexa" is spotted. As another example, the wake-word engine 770b may be configured to identify the wake word "Ok, Google" and cause the NMD 520 to invoke the GOOGLE VAS when "Ok, Google" is spotted. In single-VAS implementations, the VAS selector 774 may be omitted.

In response to the VAS wake-word event (e.g., in response to the signal Svw indicating the wake-word event), the voice extractor 773 is configured to receive and format (e.g., packetize) the sound-data stream $S_{DS}$. For instance, the voice extractor 773 packetizes the frames of the sound-data stream $S_{DS}$ into messages. The voice extractor 773 transmits or streams these messages, $M_V$, that may contain voice input in real time or near real time to a remote VAS via the network interface 724.

As noted above, in the first mode, voice input processing via cloud-based voice assistant services is disabled. In some examples, to disable the voice input processing via cloud-based voice assistant services, the NMD 703 physically or logically disables the VAS wake-word engine(s) 770. For instance, the NMD 703 may physically or logically prevent the sound-data stream $S_{DS}$ from the microphones 722a from reaching the VAS wake-word engine(s) 770 and/or voice extractor 773. Alternatively, suppressing generation may involve the NMD 703 ceasing to feed the sound-data stream $S_{DS}$ to the ASR 772. Suppressing generation may involve gating, blocking or otherwise preventing output from the VAS wake-word engine(s) 770 from generating a local keyword event.

In the second mode, voice input processing via a cloud-based voice assistant service is enabled. The VAS is configured to process the sound-data stream $S_{DS}$ contained in the messages $M_V$ sent from the NMD 703. More specifically, in the first mode, the NMD 703 is configured to identify a voice input 780a captured by the microphones 722a based on the sound-data stream $S_{DS1}$. In a second mode, the NMD 703 is configured to identify a voice input 780a captured by the microphones 772b based on the sound-data stream $S_{DS2}$. The voice inputs 780a and 780b are referred to collectively as a voice input 780 and the sound-data streams $S_{DS1}$ and $S_{DS2}$ are referred to collectively as a $S_{DS}$.

As described in connection with FIG. 2C, the voice input 780 may include a keyword portion and an utterance portion. The keyword portion may correspond to detected sound that causes a VAS wake-word event (i.e., a VAS wake word). Alternatively, the keyword portion may correspond to a local wake word or a command keyword, which may generate a local wake-word event.

For instance, when the voice input 780b includes a VAS wake word, the keyword portion corresponds to detected sound that causes the wake-word engine 770a to output the wake-word event signal Svw to the voice extractor 773. The utterance portion in this case corresponds to detected sound that potentially comprises a user request following the keyword portion.

When a VAS wake-word event occurs, the VAS may first process the keyword portion within the sound-data stream $S_{DS}$ to verify the presence of a VAS wake word. In some instances, the VAS may determine that the keyword portion comprises a false wake word (e.g., the word "Election" when the word "Alexa" is the target VAS wake word). In such an occurrence, the VAS may send a response to the NMD 703 with an instruction for the NMD 703 to cease extraction of sound data, which causes the voice extractor 773 to cease further streaming of the detected-sound data to the VAS. The VAS wake-word engine 770a may resume or continue monitoring sound specimens until it spots another potential VAS wake word, leading to another VAS wake-word event. In some implementations, the VAS does not process or receive the keyword portion but instead processes only the utterance portion.

In any case, the VAS processes the utterance portion to identify the presence of any words in the detected-sound data and to determine an underlying intent from these words. The words may correspond to one or more commands, as well as certain keywords. The keyword may be, for example, a word in the voice input identifying a particular device or group in the MPS 100. For instance, in the illustrated example, the keyword may be one or more words identifying one or more zones in which the music is to be played, such as the Living Room and the Dining Room (FIG. 1A).

To determine the intent of the words, the VAS is typically in communication with one or more databases associated with the VAS (not shown) and/or one or more databases (not shown) of the MPS 100. Such databases may store various user data, analytics, catalogs, and other information for natural language processing and/or other processing. In some implementations, such databases may be updated for adaptive learning and feedback for a neural network based on voice-input processing. In some cases, the utterance portion may include additional information such as detected pauses (e.g., periods of non-speech) between words spoken by a user, as shown in FIG. 2C. The pauses may demarcate the locations of separate commands, keywords, or other information spoke by the user within the utterance portion.

After processing the voice input, the VAS may send a response to the MPS 100 with an instruction to perform one or more actions based on an intent it determined from the voice input. For example, based on the voice input, the VAS may direct the MPS 100 to initiate playback on one or more of the playback devices 102, control one or more of these playback devices 102 (e.g., raise/lower volume, group/ungroup devices, etc.), or turn on/off certain smart devices, among other actions. After receiving the response from the VAS, the wake-word engine 770a of the NMD 703 may resume or continue to monitor the sound-data stream $S_{DS1}$ until it spots another potential wake-word, as discussed above.

In general, the one or more identification algorithms that a particular VAS wake-word engine, such as the VAS wake-word engine 770a, applies are configured to analyze certain characteristics of the detected sound stream $S_{DS}$ and compare those characteristics to corresponding characteristics of the particular VAS wake-word engine's one or more particular VAS wake words. For example, the wake-word engine 770a may apply one or more identification algorithms to spot spectral characteristics in the detected sound stream $S_{DS}$ that match the spectral characteristics of the engine's one or more wake words, and thereby determine that the detected sound $S_D$ Comprises a voice input including a particular VAS wake word.

In some implementations, the one or more identification algorithms may be third-party identification algorithms (i.e., developed by a company other than the company that provides the NMD 703a). For instance, operators of a voice service (e.g., AMAZON) may make their respective algorithms (e.g., identification algorithms corresponding to AMAZON's ALEXA) available for use in third-party devices (e.g., the NMDs 103), which are then trained to identify one or more wake words for the particular voice assistant service. Additionally, or alternatively, the one or more identification algorithms may be first-party identification algorithms that are developed and trained to identify certain wake words that are not necessarily particular to a given voice service. Other possibilities also exist.

As noted above, the NMD 703a also includes a local voice input engine 771a in parallel with the VAS wake-word engine 770a. Like the VAS wake-word engine 770a, the local voice input keyword engine 771a may apply one or more identification algorithms corresponding to one or more wake words. A "local keyword event" is generated when a particular local keyword is identified in the detected-sound $S_D$. Local keywords may take the form of a nonce wake word corresponding to local processing (e.g., "Hey Sonos"), which is different from the VAS wake words corresponding to respective voice assistant services. Local keywords may also take the form of command keywords.

In contrast to the nonce words typically as utilized as VAS wake words, command keywords function as both the activation word and the command itself. For instance, example command keywords may correspond to playback commands (e.g., "play," "pause," "skip," etc.) as well as control commands ("turn on"), among other examples. Under appropriate conditions, based on detecting one of these command keywords, the NMD 703a performs the corresponding command.

The local voice input engine 771a can employ an automatic speech recognizer 772. The ASR 772 is configured to output phonetic or phenomic representations, such as text corresponding to words, based on sound in the sound-data stream $S_{DS}$ to text. For instance, the ASR 772 may transcribe spoken words represented in the sound-data stream $S_{DS}$ to one or more strings representing the voice input 780 as text. The local voice input engine 771a can feed ASR output (labeled as $S_{ASR}$) to a local natural language unit (NLU) 779 that identifies particular keywords as being local keywords for invoking local-keyword events, as described below.

As noted above, in some example implementations, the NMD 703 is configured to perform natural language processing, which may be carried out using an onboard natural language processor, referred to herein as a natural language unit (NLU) 779. The local NLU 779 is configured to analyze text output of the ASR 772 of the local voice input keyword engine 771a to spot (i.e., detect or identify) keywords in the voice input 780. In FIG. 7A, this output is illustrated as the signal $S_{ASR}$. The local NLU 779 includes a library of keywords (i.e., words and phrases) corresponding to respective commands and/or parameters.

In one aspect, the library of the local NLU 779 includes local keywords, which, as noted above, may take the form of nonce keywords or command keywords. When the local NLU 779 identifies a local keyword in the signal $S_{ASR}$, the local voice input engine 771a generates a local keyword event. If the identified local keyword is a command keyword, the NMD 703 performs a command corresponding to the command keyword in the signal $S_{ASR}$, assuming that one or more conditions corresponding to that command keyword are satisfied. If the identified local keyword is a nonce keyword, the local NLU 779 attempts to identify a keyword or keywords corresponding to a command in the signal $S_{ASR}$.

Further, the library of the local NLU 779 may also include keywords corresponding to parameters. The local NLU 779 may then determine an underlying intent from the matched keywords in the voice input 780. For instance, if the local NLU matches the keywords "David Bowie" and "kitchen" in combination with a play command, the local NLU 779 may determine an intent of playing David Bowie in the Kitchen 101h on the playback device 102i. In contrast to a processing of the voice input 780 by a cloud-based VAS, local processing of the voice input 780 by the local NLU 779 may be relatively less sophisticated, as the NLU 779 does not have access to the relatively greater processing capabilities and larger voice databases that a VAS generally has access to.

In some examples, the local NLU 779 may determine an intent with one or more slots, which correspond to respective keywords. For instance, referring back to the play David Bowie in the Kitchen example, when processing the voice input, the local NLU 779 may determine that an intent is to play music (e.g., intent=playMusic), while a first slot includes David Bowie as target content (e.g., slot1=DavidBowie) and a second slot includes the Kitchen 101h as the target playback device (e.g., slot2=kitchen). Here, the intent (to "playMusic") is based on the command keyword and the slots are parameters modifying the intent to a particular target content and playback device.

Within examples, the local voice input engine 771a outputs a signal, $S_Lw$, that indicates the occurrence of a local keyword event to the local NLU 779. In response to the local keyword event (e.g., in response to the signal $S_LW$ indicating the command keyword event), the local NLU 779 is configured to receive and process the signal $S_{ASR}$. In particular, the local NLU 779 looks at the words within the signal $S_{ASR}$ to find keywords that match keywords in the library of the local NLU 779.

Some errors in performing local automatic speech recognition are expected. Within examples, the ASR 772 may generate a confidence score when transcribing spoken words to text, which indicates how closely the spoken words in the voice input 780 matches the sound patterns for that word. In some implementations, generating a local keyword event is based on the confidence score for a given local keyword. For instance, the local voice input engine 771a may generate a command keyword event when the confidence score for a given sound exceeds a given threshold value (e.g., 0.5 on a scale of 0-1, indicating that the given sound is more likely than not the local keyword). Conversely, when the confidence score for a given sound is at or below the given threshold value, the command keyword engine 771a does not generate the local keyword event.

Similarly, some error in performing keyword matching is expected. Within examples, the local NLU may generate a confidence score when determining an intent, which indicates how closely the transcribed words in the signal $S_{ASR}$ match the corresponding keywords in the library of the local NLU. In some implementations, performing an operation according to a determined intent is based on the confidence score for keywords matched in the signal $S_A$SR. For instance, the NMD 703 may perform an operation according to a determined intent when the confidence score for a given sound exceeds a given threshold value (e.g., 0.5 on a scale of 0-1, indicating that the given sound is more likely than not the command keyword). Conversely, when the confidence score for a given intent is at or below the given threshold value, the NMD 703 does not perform the operation according to the determined intent.

As noted above, in some implementations, a phrase may be used as a local keyword, which provides additional syllables to match (or not match). For instance, the phrase "Hey, Sonos" has more syllables than "Sonos," which provides additional sound patterns to match to words. As another example, the phrase "play me some music" has more syllables than "play," which provides additional sound patterns to match to words. Accordingly, local keywords that are phrases may generally be less prone to false wake words.

In example implementations, the NMD 703 generates a local keyword event based on a local keyword taking the form of a command keyword (and performs a command corresponding to the detected command keyword) only when certain conditions corresponding to a detected command keyword are met. These conditions are intended to lower the prevalence of false positive command keyword events. For instance, after detecting the command keyword "skip," the NMD 703*a* generates a command keyword event (and skips to the next track) only when certain playback conditions indicating that a skip should be performed are met. These playback conditions may include, for example, (i) a first condition that a media item is being played back, (ii) a second condition that a queue is active, and (iii) a third condition that the queue includes a media item subsequent to the media item being played back. If any of these conditions are not satisfied, the command keyword event is not generated (and no skip is performed).

The NMD 703 may include one or more state machine(s) 775 to facilitate determining whether the appropriate conditions are met. An example state machine 775*a* transitions between a first state and a second state based on whether one or more conditions corresponding to the detected command keyword are met. In particular, for a given command keyword corresponding to a particular command requiring one or more particular conditions, the state machine 775*a* transitions into a first state when one or more particular conditions are satisfied and transitions into a second state when at least one condition of the one or more particular conditions is not satisfied.

Within example implementations, the command conditions are based on states indicated in state variables. As noted above, the devices of the MPS 100 may store state variables describing the state of the respective device. For instance, the playback devices 102 may store state variables indicating the state of the playback devices 102, such as the audio content currently playing (or paused), the volume levels, network connection status, and the like). These state variables are updated (e.g., periodically, or based on an event (i.e., when a state in a state variable changes)) and the state variables further can be shared among the devices of the MPS 100, including the NMD 703.

Similarly, the NMD 703 may maintain these state variables (either by virtue of being implemented in a playback device or as a stand-alone NMD). The state machine(s) 775 monitor the states indicated in these state variables, and determines whether the states indicated in the appropriate state variables indicate that the command condition(s) are satisfied. Based on these determinations, the state machines 775 transition between the first state and the second state, as described above.

In some implementations, the local voice input engine 771 is disabled unless certain conditions have been met via the state machines 775. For example, the first state and the second state of the state machine 775*a* may operate as enable/disable toggles to the local voice input engine 771*a*. In particular, while a state machine 775*a* corresponding to a particular command keyword is in the first state, the state machine 775*a* enables the local voice input engine 771*a* of the particular command keyword. Conversely, while the state machine 775*a* corresponding to the particular command keyword is in the second state, the state machine 775*a* disables the local voice input engine 771*a* of the particular command keyword. Accordingly, the disabled local voice input engine 771*a* ceases analyzing the sound-data stream $S_{DS}$.

In such cases when at least one command condition is not satisfied, the NMD 703 may suppress generation of local keyword events when the local voice input engine 771*a* detects a local keyword. Suppressing generation may involve gating, blocking or otherwise preventing output from the local voice input engine 771*a* from generating a local keyword event. Alternatively, suppressing generation may involve the NMD 703 ceasing to feed the sound-data stream $S_{DS}$ to the ASR 772. Such suppression prevents a command corresponding to the detected local keyword from being performed when at least one command condition is not satisfied. In such embodiments, the local voice input engine 771*a* may continue analyzing the sound-data stream $S_{DS}$ while the state machine 775*a* is in the first state, but command keyword events are disabled.

Other example conditions may be based on the output of a voice activity detector ("VAD") 765. The VAD 765 is configured to detect the presence (or lack thereof) of voice activity in the sound-data stream $S_{DS}$. In particular, the VAD 765 may analyze frames corresponding to the pre-roll portion of the voice input 780 (FIG. 2D) with one or more voice detection algorithms to determine whether voice activity was present in the environment in certain time windows prior to a keyword portion of the voice input 780.

The VAD 765 may utilize any suitable voice activity detection algorithms. Example voice detection algorithms involve determining whether a given frame includes one or more features or qualities that correspond to voice activity, and further determining whether those features or qualities diverge from noise to a given extent (e.g., if a value exceeds a threshold for a given frame). Some example voice detection algorithms involve filtering or otherwise reducing noise in the frames prior to identifying the features or qualities.

In some examples, the VAD 765 may determine whether voice activity is present in the environment based on one or more metrics. For example, the VAD 765 can be configured distinguish between frames that include voice activity and frames that don't include voice activity. The frames that the VAD determines have voice activity may be caused by speech regardless of whether it near- or far-field. In this example and others, the VAD 765 may determine a count of frames in the pre-roll portion of the voice input 780 that indicate voice activity. If this count exceeds a threshold percentage or number of frames, the VAD 765 may be configured to output a signal or set a state variable indicating that voice activity is present in the environment. Other metrics may be used as well in addition to, or as an alternative to, such a count.

The presence of voice activity in an environment may indicate that a voice input is being directed to the NMD 703. Accordingly, when the VAD 765 indicates that voice activity is not present in the environment (perhaps as indicated by a state variable set by the VAD 765) this may be configured as one of the command conditions for the local keywords. When this condition is met (i.e., the VAD 765 indicates that voice activity is present in the environment), the state machine 775a will transition to the first state to enable performing commands based on local keywords, so long as any other conditions for a particular local keyword are satisfied.

Further, in some implementations, the NMD 703 may include a noise classifier 766. The noise classifier 766 is configured to determine sound metadata (frequency response, signal levels, etc.) and identify signatures in the sound metadata corresponding to various noise sources. The noise classifier 766 may include a neural network or other mathematical model configured to identify different types of noise in detected sound data or metadata. One classification of noise may be speech (e.g., far-field speech). Another classification, may be a specific type of speech, such as background speech, and example of which is described in greater detail with reference to FIG. 8. Background speech may be differentiated from other types of voice-like activity, such as more general voice activity (e.g., cadence, pauses, or other characteristics) of voice-like activity detected by the VAD 765.

For example, analyzing the sound metadata can include comparing one or more features of the sound metadata with known noise reference values or a sample population data with known noise. For example, any features of the sound metadata such as signal levels, frequency response spectra, etc. can be compared with noise reference values or values collected and averaged over a sample population. In some examples, analyzing the sound metadata includes projecting the frequency response spectrum onto an eigenspace corresponding to aggregated frequency response spectra from a population of NMDs. Further, projecting the frequency response spectrum onto an eigenspace can be performed as a pre-processing step to facilitate downstream classification.

In various embodiments, any number of different techniques for classification of noise using the sound metadata can be used, for example machine learning using decision trees, or Bayesian classifiers, neural networks, or any other classification techniques. Alternatively or additionally, various clustering techniques may be used, for example K-Means clustering, mean-shift clustering, expectation-maximization clustering, or any other suitable clustering technique. Techniques to classify noise may include one or more techniques disclosed in U.S. application Ser. No. 16/227,308 filed Dec. 20, 2018, and titled "Optimization of Network Microphone Devices Using Noise Classification," which is herein incorporated by reference in its entirety.

In some implementations, the additional buffer 769 (shown in dashed lines) may store information (e.g., metadata or the like) regarding the detected sound $S_D$ that was processed by the upstream AEC 763 and spatial processor 764. This additional buffer 769 may be referred to as a "sound metadata buffer." Examples of such sound metadata include: (1) frequency response data, (2) echo return loss enhancement measures, (3) voice direction measures; (4) arbitration statistics; and/or (5) speech spectral data. In example implementations, the noise classifier 766 may analyze the sound metadata in the buffer 769 to classify noise in the detected sound $S_D$.

As noted above, one classification of sound may be background speech, such as speech indicative of far-field speech and/or speech indicative of a conversation not involving the NMD 703. The noise classifier 766 may output a signal and/or set a state variable indicating that background speech is present in the environment. The presence of voice activity (i.e., speech) in the pre-roll portion of the voice input 780 indicates that the voice input 780 might not be directed to the NMD 703, but instead be conversational speech within the environment. For instance, a household member might speak something like "our kids should have a play date soon" without intending to direct the command keyword "play" to the NMD 703.

Further, when the noise classifier indicates that background speech is present is present in the environment, this condition may disable the voice input engine 771a. In some implementations, the condition of background speech being absent in the environment (perhaps as indicated by a state variable set by the noise classifier 766) is configured as one of the command conditions for the command keywords. Accordingly, the state machine 775a will not transition to the first state when the noise classifier 766 indicates that background speech is present in the environment.

Further, the noise classifier 766 may determine whether background speech is present in the environment based on one or more metrics. For example, the noise classifier 766 may determine a count of frames in the pre-roll portion of the voice input 780 that indicate background speech. If this count exceeds a threshold percentage or number of frames, the noise classifier 766 may be configured to output the signal or set the state variable indicating that background speech is present in the environment. Other metrics may be used as well in addition to, or as an alternative to, such a count.

Within example implementations, the NMD 703a may support a plurality of local keywords. To facilitate such support, the local voice input engine 771a may implement multiple identification algorithms corresponding to respective local keywords. Alternatively, the NMD 703a may implement additional local voice input engines 771b configured to identify respective local keywords. Yet further, the library of the local NLU 779 may include a plurality of local keywords and be configured to search for text patterns corresponding to these command keywords in the signal $S_{ASR}$.

Further, local keywords may require different conditions. For instance, the conditions for "skip" may be different than the conditions for "play" as "skip" may require that the condition that a media item is being played back and play may require the opposite condition that a media item is not being played back. To facilitate these respective conditions, the NMD 703a may implement respective state machines 775 corresponding to each local keyword. Alternatively, the NMD 703 may implement a state machine 775 having respective states for each command keyword. Other examples are possible as well.

Further techniques related to conditioning of local keyword events and VAS wake word events are described in in U.S. application Ser. No. 16/439,009, filed Jun. 12, 2019, and titled "Network Microphone Device With Command Keyword Conditioning," which is herein incorporated by reference in its entirety.

Referring still to FIG. 7E, in example embodiments, the VAS wake-word engine 770a and the local voice input engine 771a may take a variety of forms. For example, the VAS wake-word engine 770a and the local voice input engine 771a may take the form of one or more modules that are stored in memory of the NMD 703 (e.g., the memory 713 of FIG. 7A). As another example, the VAS wake-word engine 770a and the local voice input engine 771a may take the form of a general-purposes or special-purpose processor, or modules thereof. In this respect, multiple engines 770 and 771 may be part of the same component of the NMD 703 or each engine 770 and 771 may take the form of a component that is dedicated for the particular wake-word engine. Other possibilities also exist.

In some implementations, in the second mode, voice input processing via a cloud-based VAS and local voice input processing are concurrently enabled. A user may speak a local keyword to invoke local processing of a voice input 780b via the local voice input engine 771a. Notably, even in the second mode, the NMD 703 may forego sending any data representing the detected sound $S_D$ (e.g., the messages $M_V$) to a VAS when processing a voice input 780b including a local keyword. Rather, the voice input 780b is processed locally using the local voice input engine 771a. Accordingly, speaking a voice input 780b (with a local keyword) to the NMD 703 may provide increased privacy relative to other NMDs that process all voice inputs using a VAS.

As indicated above, some keywords in the library of the local NLU 779 correspond to parameters. These parameters may define to perform the command corresponding to a detected command keyword. When keywords are recognized in the voice input 780, the command corresponding to the detected command keyword is performed according to parameters corresponding to the detected keywords.

For instance, an example voice input 780 may be "play music at low volume" with "play" being the command keyword portion (corresponding to a playback command) and "music at low volume" being the voice utterance portion. When analyzing this voice input 780, the NLU 779 may recognize that "low volume" is a keyword in its library corresponding to a parameter representing a certain (low) volume level. Accordingly, the NLU 779 may determine an intent to play at this lower volume level. Then, when performing the playback command corresponding to "play," this command is performed according to the parameter representing a certain volume level.

In a second example, another example voice input 780 may be "play my favorites in the Kitchen" with "play" again being the command keyword portion (corresponding to a playback command) and "my favorites in the Kitchen" as the voice utterance portion. When analyzing this voice input 780, the NLU 779 may recognize that "favorites" and "Kitchen" match keywords in its library. In particular, "favorites" corresponds to a first parameter representing particular audio content (i.e., a particular playlist that includes a user's favorite audio tracks) while "Kitchen" corresponds to a second parameter representing a target for the playback command (i.e., the kitchen 101h zone. Accordingly, the NLU 779 may determine an intent to play this particular playlist in the kitchen 101h zone.

In a third example, a further example voice input 780 may be "volume up" with "volume" being the command keyword portion (corresponding to a volume adjustment command) and "up" being the voice utterance portion. When analyzing this voice input 780, the NLU 779 may recognize that "up" is a keyword in its library corresponding to a parameter representing a certain volume increase (e.g., a 10 point increase on a 100 point volume scale). Accordingly, the NLU 779 may determine an intent to increase volume. Then, when performing the volume adjustment command corresponding to "volume," this command is performed according to the parameter representing the certain volume increase.

Other example voice inputs may relate to smart device commands. For instance, an example voice input 780 may be "turn on patio lights" with "turn on" being the command keyword portion (corresponding to a power on command) and "patio lights" being the voice utterance portion. When analyzing this voice input 780, the NLU 779 may recognize that "patio" is a keyword in its library corresponding to a first parameter representing a target for the smart device command (i.e., the patio 101i zone) and "lights" is a keyword in its library corresponding to a second parameter representing certain class of smart device (i.e., smart illumination devices, or "smart lights") in the patio 101i zone. Accordingly, the NLU 779 may determine an intent to turn on smart lights associated with the patio 101i zone. As another example, another example voice input 780 may be "set temperature to 75" with "set temperature" being the command keyword portion (corresponding to a thermostat adjustment command) and "to 75" being the voice utterance portion. When analyzing this voice input 780, the NLU 779 may recognize that "to 75" is a keyword in its library corresponding to a parameter representing a setting for the thermostat adjustment command. Accordingly, the NLU 779 may determine an intent to set a smart thermostat to 75 degrees.

Within examples, certain command keywords are functionally linked to a subset of the keywords within the library of the local NLU 779, which may hasten analysis. For instance, the command keyword "skip" may be functionality linked to the keywords "forward" and "backward" and their cognates. Accordingly, when the command keyword "skip" is detected in a given voice input 780, analyzing the voice utterance portion of that voice input 780 with the local NLU 779 may involve determining whether the voice input 780 includes any keywords that match these functionally linked keywords (rather than determining whether the voice input 780 includes any keywords that match any keyword in the library of the local NLU 779). Since vastly fewer keywords are checked, this analysis is relatively quicker than a full search of the library. By contrast, a nonce VAS wake word such as "Alexa" provides no indication as to the scope of the accompanying voice input.

Some commands may require one or more parameters, as such the command keyword alone does not provide enough information to perform the corresponding command. For example, the command keyword "volume" might require a parameter to specify a volume increase or decrease, as the intent of "volume" of volume alone is unclear. As another example, the command keyword "group" may require two or more parameters identifying the target devices to group.

Accordingly, in some example implementations, when a given command keyword is detected in the voice input 780 by the command keyword engine 771a, the local NLU 779 may determine whether the voice input 780 includes keywords matching keywords in the library corresponding to the required parameters. If the voice input 780 does include keywords matching the required parameters, the NMD 703a proceeds to perform the command (corresponding to the given command keyword) according to the parameters specified by the keywords.

However, if the voice input 780 does include keywords matching the required parameters for the command, the NMD 703a may prompt the user to provide the parameters. For instance, in a first example, the NMD 703a may play an audible prompt such as "I've heard a command, but I need more information" or "Can I help you with something?" Alternatively, the NMD 703*a* may send a prompt to a user's personal device via a control application (e.g., the software components 132*c* of the control device(s) 104).

In further examples, the NMD 703*a* may play an audible prompt customized to the detected command keyword. For instance, after detect a command keyword corresponding to a volume adjustment command (e.g., "volume"), the audible prompt may include a more specific request such as "Do you want to adjust the volume up or down?" As another example, for a grouping command corresponding to the command keyword "group," the audible prompt may be "Which devices do you want to group?" Supporting such specific audible prompts may be made practicable by supporting a relatively limited number of command keywords (e.g., less than 100), but other implementations may support more command keywords with the trade-off of requiring additional memory and processing capability.

Within additional examples, when a voice utterance portion does not include keywords corresponding to one or more required parameters, the NMD 703*a* may perform the corresponding command according to one or more default parameters. For instance, if a playback command does not include keywords indicating target playback devices 102 for playback, the NMD 703*a* may default to playback on the NMD 703*a* itself (e.g., if the NMD 703*a* is implemented within a playback device 102) or to playback on one or more associated playback devices 102 (e.g., playback devices 102 in the same room or zone as the NMD 703*a*). Further, in some examples, the user may configure default parameters using a graphical user interface (e.g., user interface 430) or voice user interface. For example, if a grouping command does not specify the playback devices 102 to group, the NMD 703*a* may default to instructing two or more pre-configured default playback devices 102 to form a synchrony group. Default parameters may be stored in data storage and accessed when the NMD 703*a* determines that keywords exclude certain parameters. Other examples are possible as well.

In some implementations, while in the second mode, the NMD 703*a* sends the voice input 780 to a VAS when the local NLU 779 is unable to process the voice input 780 (e.g., when the local NLU is unable to find matches to keywords in the library, or when the local NLU 779 has a low confidence score as to intent). In an example, to trigger sending the voice input 780, the NMD 703*a* may generate a bridging event, which causes the voice extractor 773 to process the sound-data stream $S_D$, as discussed above. That is, the NMD 703*a* generates a bridging event to trigger the voice extractor 773 without a VAS wake-word being detected by the VAS wake-word engine 770*a* (instead based on a command keyword in the voice input 780, as well as the NLU 779 being unable to process the voice input 780).

Before sending the voice input 780 to the VAS (e.g., via the messages $M_V$), the NMD 703*a* may obtain confirmation from the user that the user acquiesces to the voice input 780 being sent to the VAS. For instance, the NMD 703*a* may play an audible prompt to send the voice input to a default or otherwise configured VAS, such as "I'm sorry, I didn't understand that. May I ask Alexa?" In another example, the NMD 703*a* may play an audible prompt using a VAS voice (i.e., a voice that is known to most users as being associated with a particular VAS), such as "Can I help you with something?" In such examples, generation of the bridging event (and trigging of the voice extractor 773) is contingent on a second affirmative voice input 780 from the user.

Within certain example implementations, while in the first mode, the local NLU 779 may process the signal $S_{ASR}$ without necessarily a local keyword event being generated by the command keyword engine 771*a* (i.e., directly). That is, the automatic speech recognition 772 may be configured to perform automatic speech recognition on the sound-data stream $S_D$, which the local NLU 779 processes for matching keywords without requiring a local keyword event. If keywords in the voice input 780 are found to match keywords corresponding to a command (possibly with one or more keywords corresponding to one or more parameters), the NMD 703*a* performs the command according to the one or more parameters.

Further, in such examples, the local NLU 779 may process the signal $S_{ASR}$ directly only when certain conditions are met. In particular, in some embodiments, the local NLU 779 processes the signal $S_{ASR}$ only when the state machine 775*a* is in the first state. The certain conditions may include a condition corresponding to no background speech in the environment. An indication of whether background speech is present in the environment may come from the noise classifier 766. As noted above, the noise classifier 766 may be configured to output a signal or set a state variable indicating that far-field speech is present in the environment. Further, another condition may correspond to voice activity in the environment. The VAD 765 may be configured to output a signal or set a state variable indicating that voice activity is present in the environment. The prevalence of false positive detection of commands with a direct processing approach may be mitigated using the conditions determined by the state machine 775*a*.

Figure 8A:
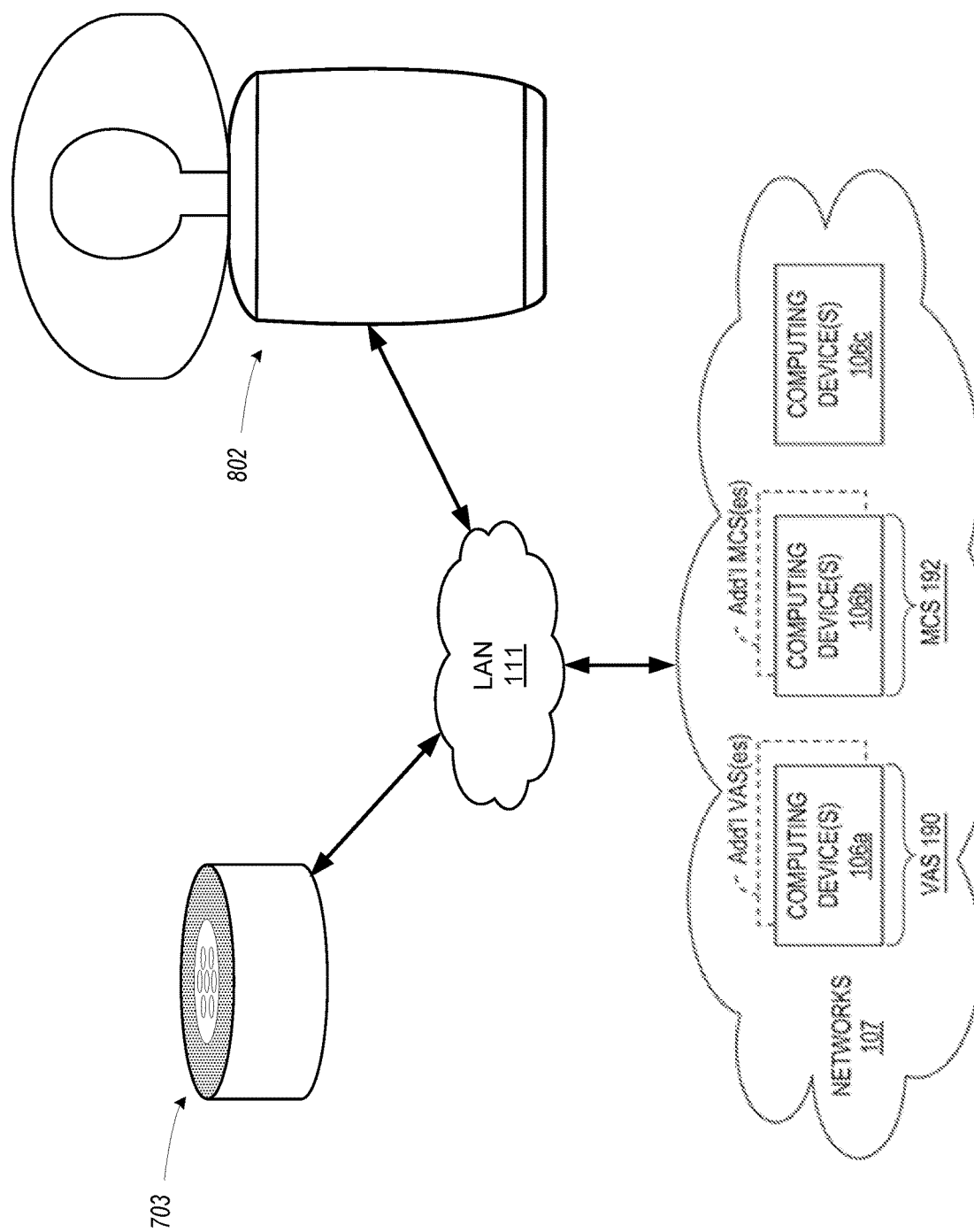
FIG. 8A is a schematic diagram illustrating the example network microphone device operating in a first mode while paired with an example network device.

In example implementations, the NMD 703 is paired with one or more smart devices. FIG. 8A illustrates an example pairing arrangement between the NMD 703 and a smart device 802, which includes an integrated playback device and smart illumination device. By pairing the NMD 703 with the smart device(s), voice commands to control the smart device(s) may be directed to the NMD 703 to control the smart device(s) without necessarily including a keyword identifying the smart device(s) in the voice command. For instance, commands such as "play back Better Oblivion Community Center" and "turn on lights" are received by the NMD 703, but carried out on the smart device 802 without necessarily identifying the smart device 802 by name, room, zone, or the like. On the other hand, a user may still direct inputs to other smart devices in the MPS 100 by referencing the name, room, zone, group, area, etc. that the smart device is associated with.

Within examples, a user may configure the pairing arrangement using a graphical user interface or voice user interface. For instance, the user may use a GUI on a application of a control device 104 to configure the pairing arrangement. Alternatively, the user may speak a voice command such as "Please pair with the Ikea® lamp" or "Please pair with the Sonos® Play:1" to configure the pairing relationship. The NMD 703 may store data representing the pairing arrangement in one or more state variables, which may be referenced when identifying a device to carry out a voice command.

In the illustrative example of FIG. 8A, the NMD 703 is operating in the second mode. That is, the NMD 703 is in the second orientation and has enabled the second mode. Voice processing via the cloud-based voice assistant service(s) is enabled. The NMD 703 has established a local network connection via the LAN 111 to the smart device 802, as well as an Internet-based connection to the VAS 190 via the network 107 (FIG. 1B). Likewise, the smart device 802 has established a local network connection via the LAN 111 to the NMD 703, as well as an Internet-based connection to the VAS 190 via the network 107 (FIG. 1B).

Further, in the exemplary pairing relationship of FIG. 8A, the smart device 802 may play back audio responses to voice inputs. As noted above, the NMD 703 may, in some examples, exclude audio playback components typically present in a playback device (e.g., audio processing components 216, amplifiers 217, and/or speakers 218) or may include relatively less capable versions of these components. By pairing the NMD 703 to a playback device, the playback device may provide playback functions to complement the NMD, including playback of audio responses to voice inputs captured by the NMD 703 and playback of audio content initiated via voice command to the NMD 703.

For instance, while in the second mode, the user may speak the voice input "Alexa, what is the weather," which is captured by the microphones 722b (FIG. 7C) of the NMD 703. The NMD 703 transmits data representing this voice input to the servers 106a of the VAS 190. The servers 106a process this voice input and provide data representing a spoken response. In some implementations, the smart device 802 receives this data directly from the computing devices 106a of the VAS 190 via the networks 107 and the LAN 111. Alternatively, the NMD 703 may receive the data from the VAS 190, but send the data to the smart device 802. In either case, the playback device 802 plays back the spoken response.

As noted above, in the second mode, voice input processing via the VAS 190 and voice input processing via the local voice input engine 771a may be concurrently enabled. In an example, a user may speak the voice input "Alexa, play 'Hey Jude' by the Beatles and turn on the Ikea lamps." Here, "Alexa" is an example of a VAS wake word and "Ikea" is an example of a local keyword. Accordingly, such an input may generate both a VAS wake work event and a local keyword event on the NMD 703.

FIG. 8B again shows the exemplary pairing relationship between the NMD 703 and the smart device 802. In this FIG. 8B example, the NMD 703 is operating in the first mode, so voice input processing via the VAS 190 is disabled. This state is represented by the broken lines between the LAN 111 to the networks 107. While in the first mode, the NMD 703 may receive voice inputs including commands to control the smart device 802. The NMD 703 may process such voice inputs via the local voice input engine 771a and transmit instructions to carry out the commands to the smart device 802 via the LAN 111.

In some examples, the library of the local NLU 779 is partially customized to the individual user(s). In a first aspect, the library may be customized to the devices that are within the household of the NMD (e.g., the household within the environment 101 (FIG. 1A)). For instance, the library of the local NLU may include keywords corresponding to the names of the devices within the household, such as the zone names of the playback devices 102 in the MPS 100. In a second aspect, the library may be customized to the users of the devices within the household. For example, the library of the local NLU 779 may include keywords corresponding to names or other identifiers of a user's preferred playlists, artists, albums, and the like. Then, the user may refer to these names or identifiers when directing voice inputs to the command keyword engine 771a and the local NLU 779.

Within example implementations, the NMD 703a may populate the library of the local NLU 779 locally within the network 111 (FIG. 1B). As noted above, the NMD 703a may maintain or have access to state variables indicating the respective states of devices connected to the network 111 (e.g., the playback devices 104). These state variables may include names of the various devices. For instance, the kitchen 101h may include the playback device 101b, which are assigned the zone name "Kitchen." The NMD 703a may read these names from the state variables and include them in the library of the local NLU 779 by training the local NLU 779 to recognize them as keywords. The keyword entry for a given name may then be associated with the corresponding device in an associated parameter (e.g., by an identifier of the device, such as a MAC address or IP address). The NMD 703a can then use the parameters to customize control commands and direct the commands to a particular device.

In further examples, the NMD 703a may populate the library by discovering devices connected to the network 111. For instance, the NMD 703a may transmit discovery requests via the network 111 according to a protocol configured for device discovery, such as universal plug-and-play (UPnP) or zero-configuration networking. Devices on the network 111 may then respond to the discovery requests and exchange data representing the device names, identifiers, addresses and the like to facilitate communication and control via the network 111. The NMD 703 may read these names from the exchanged messages and include them in the library of the local NLU 779 by training the local NLU 779 to recognize them as keywords.

In further examples, the NMD 703a may populate the library using the cloud. To illustrate, FIG. 9 is a schematic diagram of the MPS 100 and a cloud network 902. The cloud network 902 includes cloud servers 906, identified separately as media playback system control servers 906a, streaming audio service servers 906b, and IOT cloud servers 906c. The streaming audio service servers 906b may represent cloud servers of different streaming audio services. Similarly, the IOT cloud servers 906c may represent cloud servers corresponding to different cloud services supporting smart devices 990 in the MPS 100. Smart devices 990 include smart illumination devices, smart thermostats, smart plugs, security cameras, doorbells, and the like.

Within examples, a user may link an account of the MPS 100 to an account of a IOT service. For instance, an IOT manufacturer (such as IKEA®) may operate a cloud-based IOT service to facilitate cloud-based control of their IOT products using smartphone app, website portal, and the like. In connection with such linking, keywords associated with the cloud-based service and the IOT devices may be populated in the library of the local NLU 779. For instance, the library may be populated with a nonce keyword (e.g., "Hey Ikea"). Further, the library may be populated with names of various IOT devices, keyword commands for controlling the IOT devices, and keywords corresponding to parameters for the commands.

One or more communication links 903a, 903b, and 903c (referred to hereinafter as "the links 903") communicatively couple the MPS 100 and the cloud servers 906. The links 903 can include one or more wired networks and one or more wireless networks (e.g., the Internet). Further, similar to the network 111 (FIG. 1B), a network 911 communicatively couples the links 903 and at least a portion of the devices (e.g., one or more of the playback devices 102, NMDs 103 and 703a, control devices 104, and/or smart devices 990) of the MPS 100.

In some implementations, the media playback system control servers 906a facilitate populating the library of local NLU 779 with the NMD(s) 703a (representing one or more of the NMD 703a (FIG. 7A) within the MPS 100). In an example, the media playback system control servers 906a may receive data representing a request to populate the library of a local NLU 779 from the NMD 703. Based on this request, the media playback system control servers 906a may communicate with the streaming audio service servers 906b and/or IOT cloud servers 906c to obtain keywords specific to the user.

In some examples, the media playback system control servers 906a may utilize user accounts and/or user profiles in obtaining keywords specific to the user. As noted above, a user of the MPS 100 may set-up a user profile to define settings and other information within the MPS 100. The user profile may then in turn be registered with user accounts of one or more streaming audio services to facilitate streaming audio from such services to the playback devices 102 of the MPS 100.

Through use of these registered streaming audio services, the streaming audio service servers 906b may collect data indicating a user's saved or preferred playlists, artists, albums, tracks, and the like, either via usage history or via user input (e.g., via a user input designating a media item as saved or a favorite). This data may be stored in a database on the streaming audio service servers 906b to facilitate providing certain features of the streaming audio service to the user, such as custom playlists, recommendations, and similar features. Under appropriate conditions (e.g., after receiving user permission), the streaming audio service servers 906b may share this data with the media playback system control servers 906a over the links 903b.

Accordingly, within examples, the media playback system control servers 906a may maintain or have access to data indicating a user's saved or preferred playlists, artists, albums, tracks, genres, and the like. If a user has registered their user profile with multiple streaming audio services, the saved data may include saved playlists, artists, albums, tracks, and the like from two or more streaming audio services. Further, the media playback system control servers 906a may develop a more complete understanding of the user's preferred playlists, artists, albums, tracks, and the like by aggregating data from the two or more streaming audio services, as compared with a streaming audio service that only has access to data generated through use of its own service.

Moreover, in some implementations, in addition to the data shared from the streaming audio service servers 906b, the media playback system control servers 906a may collect usage data from the MPS 100 over the links 903a, after receiving user permission. This may include data indicating a user's saved or preferred media items on a zone basis. Different types of music may be preferred in different rooms. For instance, a user may prefer upbeat music in the Kitchen 101h and more mellow music to assist with focus in the Office 101e.

Using the data indicating a user's saved or preferred playlists, artists, albums, tracks, and the like, the media playback system control servers 906a may identify names of playlists, artists, albums, tracks, and the like that the user is likely to refer to when providing playback commands to the NMDs 703 via voice input. Data representing these names can then be transmitted via the links 903a and the network 904 to the NMDs 703a and then added to the library of the local NLU 779 as keywords. For instance, the media playback system control servers 906a may send instructions to the NMD 703 to include certain names as keywords in the library of the local NLU 779. Alternatively, the NMD 703 (or another device of the MPS 100) may identify names of playlists, artists, albums, tracks, and the like that the user is likely to refer to when providing playback commands to the NMD 703 via voice input and then include these names in the library of the local NLU 779.

Due to such customization, similar voice inputs may result in different operations being performed when the voice input is processed by the local NLU 779 as compared with processing by a VAS. For instance, a first voice input of "Alexa, play me my favorites in the Office" may trigger a VAS wake-word event, as it includes a VAS wake word ("Alexa"). A second voice input of "Play me my favorites in the Office" may trigger a command keyword, as it includes a command keyword ("play"). Accordingly, the first voice input is sent by the NMD 703a to the VAS, while the second voice input is processed by the local NLU 779.

While these voice inputs are nearly identical, they may cause different operations. In particular, the VAS may, to the best of its ability, determine a first playlist of audio tracks to add to a queue of the playback device 102f in the office 101e. Similarly, the local NLU 779 may recognize keywords "favorites" and "kitchen" in the second voice input. Accordingly, the NMD 703a performs the voice command of "play" with parameters of <favorites playlist> and <kitchen 101h zone>, which causes a second playlist of audio tracks to be added to the queue of the playback device 102f in the office 101e. However, the second playlist of audio tracks may include a more complete and/or more accurate collection of the user's favorite audio tracks, as the second playlist of audio tracks may draw on data indicating a user's saved or preferred playlists, artists, albums, and tracks from multiple streaming audio services, and/or the usage data collected by the media playback system control servers 906a. In contrast, the VAS may draw on its relatively limited conception of the user's saved or preferred playlists, artists, albums, and tracks when determining the first playlist.

Figure 11:
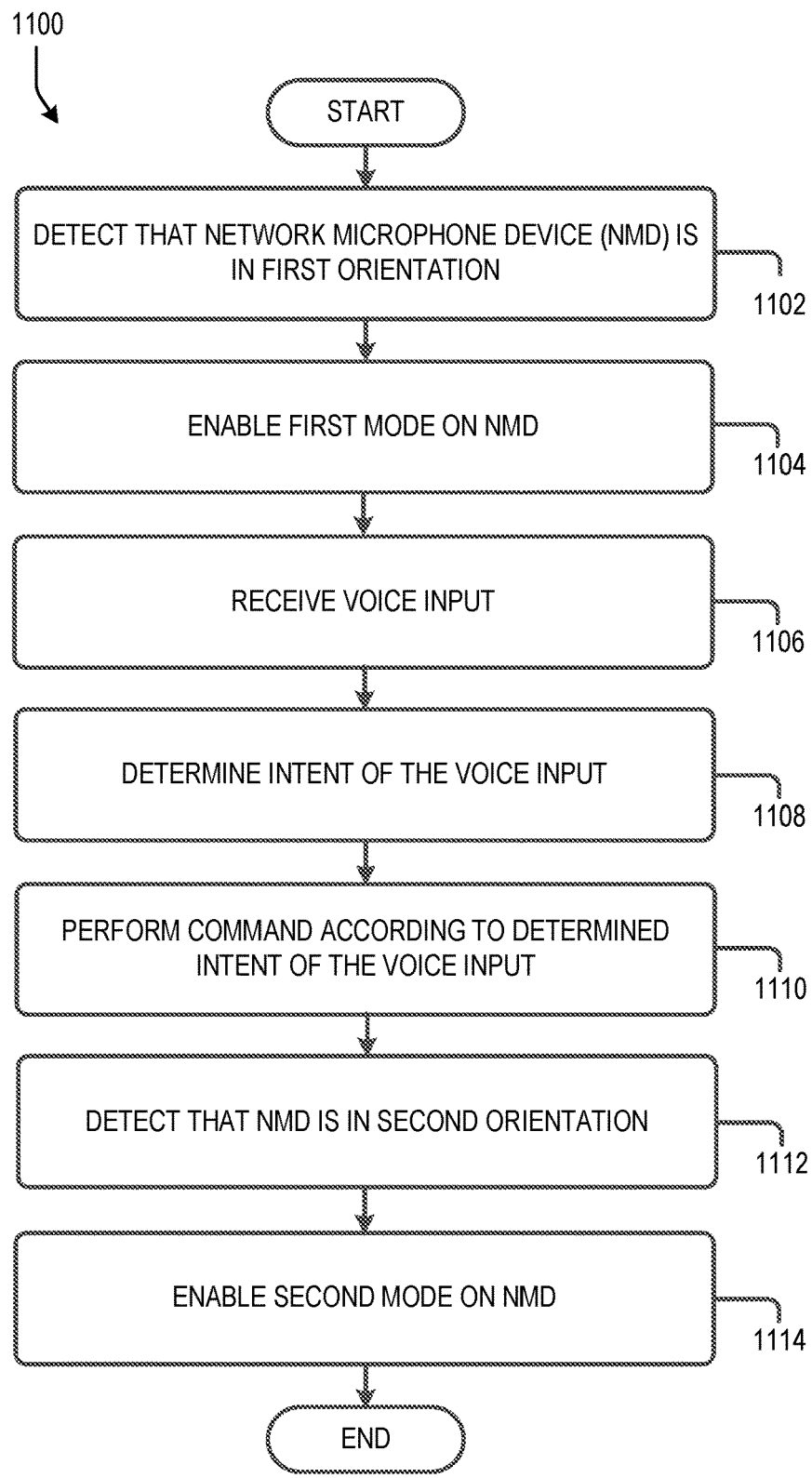
FIG. 11 is a flow diagram of an example method to toggle a VAS based on orientation in accordance with aspects of the disclosure.

To illustrate, FIG. 11 shows a table 1100 illustrating the respective contents of a first and second playlist determined based on similar voice inputs, but processed differently. In particular, the first playlist is determined by a VAS while the second playlist is determined by the NMD 703a (perhaps in conjunction with the media playback system control servers 906a). As shown, while both playlists purport to include a user's favorites, the two playlists include audio content from dissimilar artists and genres. In particular, the second playlist is configured according to usage of the playback device 102f in the Office 101e and also the user's interactions with multiple streaming audio services, while the first playlist is based on the multiple user's interactions with the VAS. As a result, the second playlist is more attuned to the types of music that the user prefers to listen to in the office 101e (e.g., indie rock and folk) while the first playlist is more representative of the interactions with the VAS as a whole.

A household may include multiple users. Two or more users may configure their own respective user profiles with the MPS 100. Each user profile may have its own user accounts of one or more streaming audio services associated with the respective user profile. Further, the media playback system control servers 906a may maintain or have access to data indicating each user's saved or preferred playlists, artists, albums, tracks, genres, and the like, which may be associated with the user profile of that user.

In various examples, names corresponding to user profiles may be populated in the library of the local NLU 779. This may facilitate referring to a particular user's saved or preferred playlists, artists, albums, tracks, or genres. For instance, when a voice input of "Play Anne's favorites on the patio" is processed by the local NLU 779, the local NLU 779 may determine that "Anne" matches a stored keyword corresponding to a particular user. Then, when performing the playback command corresponding to that voice input, the NMD 703*a* adds a playlist of that particular user's favorite audio tracks to the queue of the playback device 102*c* in the patio 101*i*.

In some cases, a voice input might not include a keyword corresponding to a particular user, but multiple user profiles are configured with the MPS 100. In some cases, the NMD 703*a* may determine the user profile to use in performing a command using voice recognition. Alternatively, the NMD 703*a* may default to a certain user profile. Further, the NMD 703*a* may use preferences from the multiple user profiles when performing a command corresponding to a voice input that did not identify a particular user profile. For instance, the NMD 703*a* may determine a favorites playlist including preferred or saved audio tracks from each user profile registered with the MPS 100.

The IOT cloud servers 906*c* may be configured to provide supporting cloud services to the smart devices 990. The smart devices 990 may include various "smart" internet-connected devices, such as lights, thermostats, cameras, security systems, appliances, and the like. For instance, an IOT cloud server 906*c* may provide a cloud service supporting a smart thermostat, which allows a user to control the smart thermostat over the internet via a smartphone app or website.

Accordingly, within examples, the IOT cloud servers 906*c* may maintain or have access to data associated with a user's smart devices 990, such as device names, settings, and configuration. Under appropriate conditions (e.g., after receiving user permission), the IOT cloud servers 906*c* may share this data with the media playback system control servers 906*a* and/or the NMD 703*a* via the links 903*c*. For instance, the IOT cloud servers 906*c* that provide the smart thermostat cloud service may provide data representing such keywords to the NMD 703*a*, which facilitates populating the library of the local NLU 779 with keywords corresponding to the temperature.

Yet further, in some cases, the IOT cloud servers 906*c* may also provide keywords specific to control of their corresponding smart devices 990. For instance, the IOT cloud server 906*c* that provides the cloud service supporting the smart thermostat may provide a set of keywords corresponding to voice control of a thermostat, such as "temperature," "warmer," or "cooler," among other examples. Data representing such keywords may be sent to the NMDs 703*a* over the links 903 and the network 904 from the IOT cloud servers 906*c*.

As noted above, some households may include more than NMD 703. In example implementations, two or more NMDs 703 may synchronize or otherwise update the libraries of their respective local NLU 779. For instance, a first NMD 703*a* and a second NMD 703*b* may share data representing the libraries of their respective local NLU 779, possibly using a network (e.g., the network 904). Such sharing may facilitate the NMDs 703*a* being able to respond to voice input similarly, among other possible benefits.

In some embodiments, one or more of the components described above can operate in conjunction with the microphones 720 to detect and store a user's voice profile, which may be associated with a user account of the MPS 100. In some embodiments, voice profiles may be stored as and/or compared to variables stored in a set of command information or data table. The voice profile may include aspects of the tone or frequency of a user's voice and/or other unique aspects of the user, such as those described in previously-referenced U.S. patent application Ser. No. 15/438,749.

In some embodiments, one or more of the components described above can operate in conjunction with the microphones 720 to determine the location of a user in the home environment and/or relative to a location of one or more of the NMDs 103. Techniques for determining the location or proximity of a user may include one or more techniques disclosed in previously-referenced U.S. patent application Ser. No. 15/438,749, U.S. Pat. No. 9,084,058, filed Dec. 29, 2011, and titled "Sound Field Calibration Using Listener Localization," and U.S. Pat. No. 8,965,033, filed Aug. 31, 2012, and titled "Acoustic Optimization." Each of these applications is herein incorporated by reference in its entirety.

FIGS. 10A, 10B, 10C, and 10D show exemplary input and output from the NMD 703 configured in accordance with aspects of the disclosure.

FIG. 10A illustrates a first scenario in which a wake-word engine of the NMD 703 is configured to detect four local keywords ("play", "stop", "resume", "turn on"). The local NLU 779 (FIG. 7E) is disabled. In this scenario, the user has spoken the voice input "turn on" to the NMD 703, which triggers a new recognition of one of the local keywords (e.g., a command keyword event corresponding to turn on).

Yet further, the VAD 765 and noise classifier 766 (FIG. 7E) have analyzed 150 frames of a pre-roll portion of the voice input. As shown, the VAD 765 has detected voice in 140 frames of the 150 pre-roll frames, which indicates that a voice input may be present in the detected sound. Further, the noise classifier 766 has detected ambient noise in 11 frames, background speech in 127 frames, and fan noise in 12 frames. In this example, the noise classifier 766 is classifying the predominant noise source in each frame. This indicates the presence of background speech. As a result, the NMD has determined not to trigger on the detected local keyword "turn on."

FIG. 10B illustrates a second scenario in which the local voice input engine 771*a* of the NMD 703 is configured to detect a local keyword ("play") as well as two cognates of that command keyword ("play something" and "play me a song"). The local NLU 779 is disabled. In this second scenario, the user has spoken the voice input "play something" to the NMD 703, which triggers a new recognition of one of the local keywords (e.g., a command keyword event).

Yet further, the VAD 765 and noise classifier 766 have analyzed 150 frames of a pre-roll portion of the voice input. As shown, the VAD 765 has detected voice in 87 frames of the 150 pre-roll frames, which indicates that a voice input may be present in the detected sound. Further, the noise classifier 766 has detected ambient noise in 18 frames, background speech in 8 frames, and fan noise in 124 frames. This indicates that background speech is not present. Given the foregoing, the NMD 703 has determined to trigger on the detected local keyword "play."

FIG. 10C illustrates a third scenario in which the local voice input engine 771*a* of the NMD 703 is configured to detect three local keywords ("play", "stop", and "resume"). The local NLU 779 is enabled. In this third scenario, the user has spoken the voice input "play Beatles in the Kitchen" to the NMD 703, which triggers a new recognition of one of the local keywords (e.g., a command keyword event corresponding to play).

As shown, the ASR 772 has transcribed the voice input as "play beet les in the kitchen." Some error in performing ASR is expected (e.g., "beet les"). Here, the local NLU 779 has matched the keyword "beet les" to "The Beatles" in the local NLU library, which sets up this artist as a content parameter to the play command. Further, the local NLU 779 has also matched the keyword "kitchen" to "kitchen" in the local NLU library, which sets up the kitchen zone as a target parameter to the play command. The local NLU produced a confidence score of 0.63428231948273443 associated with the intent determination.

Here as well, the VAD 765 and noise classifier 766 have analyzed 150 frames of a pre-roll portion of the voice input. As shown, the noise classifier 766 has detected ambient noise in 142 frames, background speech in 8 frames, and fan noise in 0 frames. This indicates that background speech is not present. The VAD 765 has detected voice in 112 frames of the 150 pre-roll frames, which indicates that a voice input may be present in the detected sound. Here, the NMD 703 has determined to trigger on the detected command keyword "play."

FIG. 10D illustrates a fourth scenario in which the local voice input engine 771*a* of the NMD is not configured to spot any local keywords. Rather, the local voice input engine 771*a* will perform ASR and pass the output of the ASR to the local NLU 779. The local NLU 779 is enabled and configured to detect keywords corresponding to both commands and parameters. In the fourth scenario, the user has spoken the voice input "play some music in the Office" to the NMD 703.

As shown, the ASR 772 has transcribed the voice input as "lay some music in the office." Here, the local NLU 779 has matched the keyword "lay" to "play" in the local NLU library, which corresponds to a playback command. Further, the local NLU 779 has also matched the keyword "office" to "office" in the local NLU library, which sets up the office 101*e* zone as a target parameter to the play command. The local NLU 779 produced a confidence score of 0.14620494842529297 associated with the keyword matching. In some examples, this low confidence score may cause the NMD to not accept the voice input (e.g., if this confidence score is below a threshold, such as 0.5).

IV. Example VAS Toggle Techniques

FIG. 11 is a flow diagram showing an example method 1100 to toggle voice input processing based on device orientation. The method 1100 may be performed by a networked microphone device, such as the NMD 703 (FIG. 7A). Alternatively, the method 1100 may be performed by any suitable device or by a system of devices, such as the playback devices 103, NMDs 103, control devices 104, computing devices 105, computing devices 106, and/or NMD 703.

At block 1102, the method 1100 involves detecting that the housing is in a first orientation. For instance, one or more orientation sensors (e.g., the orientation sensor(s) 723 (FIG. 7A)) may generate data indicative of the orientation of the NMD 703. The NMD 703 may detect that the housing 730 is in a first orientation (FIG. 7B).

In some implementations, the NMD 703 is configured to generate events when the orientation of the NMD 703 changes. Such events may trigger mode changes in the NMD 703. For instance, when the housing 730 is switched from a second orientation (FIG. 7C) to a second orientation (FIG. 7B), the orientation sensors 723 may generate data indicative of acceleration of the NMD 703. The NMD 703 may determine that this data indicates that the housing 730 is in the first orientation and generate an event indicating this orientation. In some examples, the orientation state of the NMD 703 is stored in one or more state variables, which can be referenced to determine the current orientation of the NMD 703.

At block 1104, the method 1100 involves enabling a first mode. Enabling the first mode involves disabling voice input processing via a cloud-based voice assistant service and enabling voice input processing via a local natural language unit, such as the NLU 779 (FIG. 7E). Enabling the first mode may further involve enabling one or more first microphones (e.g., the microphones 722*a* (FIG. 7B)) and/or disabling one or more second microphones (e.g., the microphones 722*b* (FIG. 7C)).

In some examples, the NMD 703 enables the first mode after detecting that the housing is in a first orientation. As noted above, detecting that the housing is in a first orientation may involve detecting an event. For example, the NMD 703 may enable the first mode based on a particular event being generated where the particular event corresponds to a change in orientation from the second orientation to the first orientation.

The first mode may remain enabled while the housing is in the first orientation. In some examples, while in the first mode, the NMD 703 may directly (e.g., via orientation sensor(s) 723) or indirectly (e.g., via the one or more state variables) determine whether the NMD 703 is still in the first orientation. If the NMD 703 determines that the NMD 703 is no longer in the first orientation, the NMD 703 may switch modes.

At block 1106, the method 1100 involves receiving a voice input. Receiving a voice input may involve capturing sound data associated with a first voice input 780*a* via the one or more first microphones 722*a* (FIG. 7E). Receiving the voice input may further involve detecting, via a local natural language unit 779, that the first voice input comprises sound data matching one or more keywords from a local natural language unit library of the local natural language unit 779. For instance, local natural language unit 779 may determine that the voice input includes one or more local keywords that generate a local keyword event, such as a nonce local keyword and/or a command keyword, as well as one or more additional keywords that correspond to parameters of the voice command.

Figure 8B:
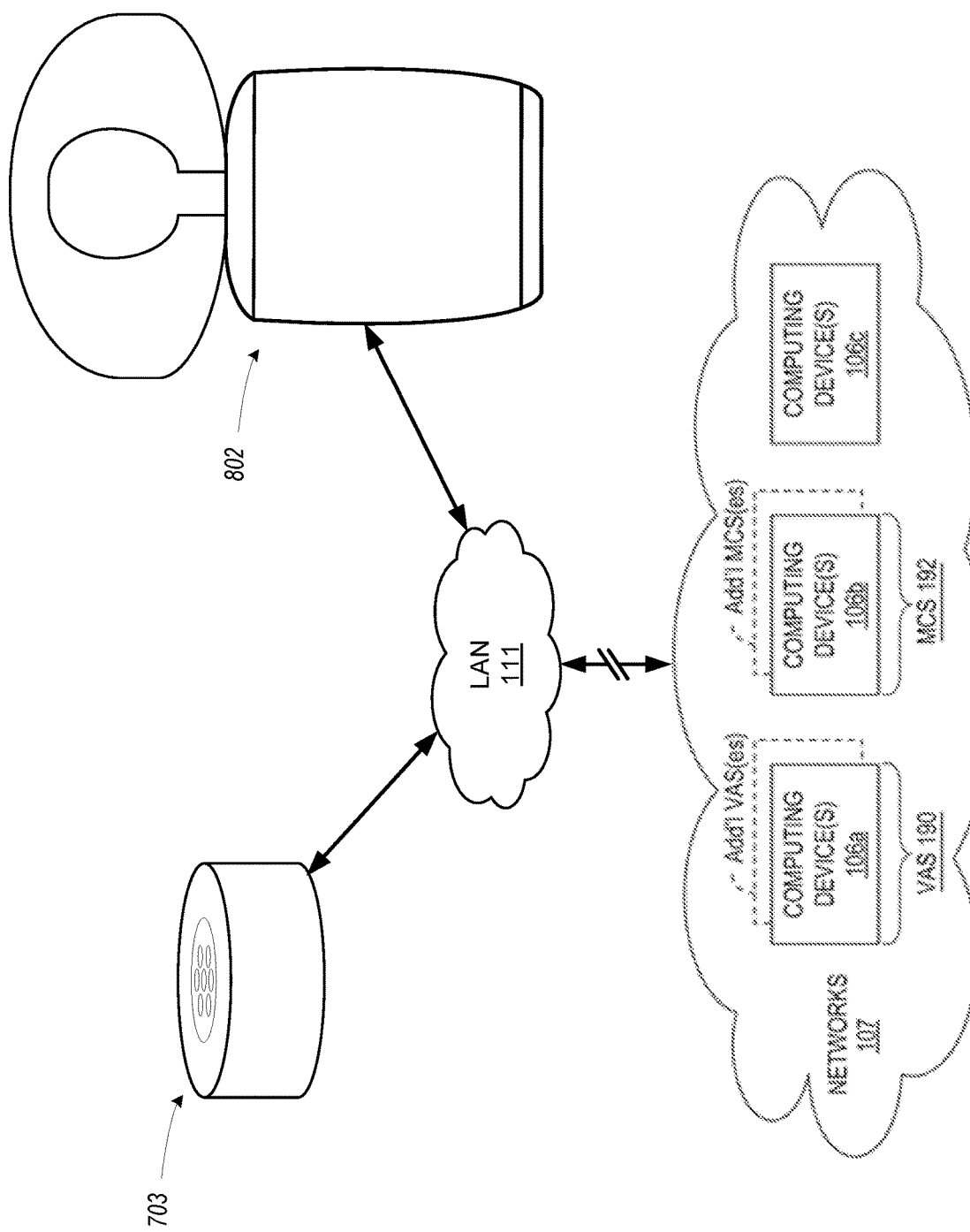
FIG. 8B is a schematic diagram illustrating the example network microphone device operating in a second mode while paired with the example network device.

At block 1108, the method 1100 involves determining, via the local natural language unit, an intent of the first voice input based on at least one of the one or more keywords. For instance, the NLU 779 may determine that the voice input includes a particular command keyword (e.g., turn on) and one or more keywords corresponding to parameters (e.g., the lights) and determine an intent of turning on the lights on a paired smart device 802 (FIG. 8B).

At block 1110, the method 1100 involves performing a first command according to the determined intent of the first voice input. Performing the first command may involve sending instructions to one or more network devices over a network to perform one or more operations according to the first command, similar to the message exchange illustrated in FIG. 6. For instance, the NMD 703 may transmit an instruction over the LAN 111 to the smart device 802 to toggle the lights or to play back audio content.

Within examples, the target network devices to perform the first command may be explicitly or implicitly defined. For example, the target smart devices may be explicitly defined by reference in the voice input 780 to the name(s) of one or more smart devices (e.g., by reference to a room, zone or zone group name). Alternatively, the voice input might not include any reference to the name(s) of one or more smart devices and instead may implicitly refer to smart device(s) paired with the NMD 703. Playback devices 102 associated with the NMD 703*a* may include a playback device implementing the NMD 703*a*, as illustrated by the playback device 102*d* implementing the NMD 103*d* (FIG. 1B)) or playback devices configured to be associated (e.g., where the playback devices 102 are in the same room or area as the NMD 703*a*).

Further, performing the first command may involve sending instructions to one or more remote computing devices. For example, the NMD 703 may transmit requests to the computing devices 106 of the MCS 192 to stream one or more audio tracks to the smart device 902 (FIG. 8B). Alternatively, the instructions may be provided internally (e.g., over a local bus or other interconnection system) to one or more software or hardware components (e.g., the electronics 112 of the playback device 102).

Yet further, transmitting instructions may involve both local and cloud based operations. For instance, the NMD 703 may transmit instructions locally over the LAN 111 to the smart device 802 to add one or more audio tracks to the playback queue over the LAN 111. Then, the smart device 802 may transmit a request to the computing devices 106 of the MCS 192 to stream one or more audio tracks to the smart device 802 for playback over the networks 107. Other examples are possible as well.

At block 1112, the method 1100 involves detecting that the housing is in a second orientation different than the first orientation. For instance, one or more orientation sensors (e.g., the orientation sensor(s) 723 (FIG. 7A)) may generate data indicative of the orientation of the NMD 703. The NMD 703 may detect that the housing 730 is in a first orientation (FIG. 7B).

As noted above, in some implementations, the NMD 703 is configured to generate events when the orientation of the NMD 703 changes. Such events may trigger mode changes in the NMD 703. For instance, when the housing 730 is switched from the first orientation to the second orientation (FIG. 7D), the orientation sensors 723 may generate data indicative of acceleration of the NMD 703. The NMD 703 may determine that this data indicates that the housing 730 is in the second orientation and generate an event indicating this orientation.

At block 1114, the method 1100 involves enabling a second mode. Enabling the second mode involves enabling voice input processing via a cloud-based voice assistant service. In some implementations, enabling the second mode also includes disabling voice input processing via a local natural language unit, such as the NLU 779 (FIG. 7E). Alternatively, voice input processing via the local natural language unit may remain enabled in the second mode. Enabling the second mode may further involve enabling one or more second microphones (e.g., the microphones 722*b* (FIG. 7C)) and/or disabling one or more first microphones (e.g., the microphones 722*a* (FIG. 7B)).

In some examples, the NMD 703 enables the second mode after detecting that the housing is in a second orientation. As noted above, detecting that the housing is in a first orientation may involve detecting an event. For example, the NMD 703 may enable the second mode based on a particular event being generated where the particular event corresponds to a change in orientation from the second orientation to the first orientation. Other examples are possible as well.

CONCLUSION

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The present technology is illustrated, for example, according to various aspects described below. Various examples of aspects of the present technology are described as numbered examples (1, 2, 3, etc.) for convenience. These are provided as examples and do not limit the present technology. It is noted that any of the dependent examples may be combined in any combination, and placed into a respective independent example. The other examples can be presented in a similar manner.

Example 1: A method to be performed by a network microphone device including one or more first microphones, one or more second microphones, a network interface, one or more processors, and a housing carrying the one or more first microphones, the one or more second microphones, the network interface, the one or more processors, and data storage having stored therein instructions executable by the one or more processors. The network microphone device detects that the housing is in a first orientation. After detecting that the housing is in the first orientation, the device enables a first mode. Enabling the first mode includes (i) disabling voice input processing via a cloud-based voice assistant service and (ii) enabling voice input processing via a local natural language unit. While the first mode is enabled, the network microphone device (i) captures sound data associated with a first voice input via the one or more first microphones and (ii) detects, via a local natural language unit, that the first voice input comprises sound data matching one or more keywords from a local natural language unit library of the local natural language unit. The network microphone device determines, via the local natural language unit, an intent of the first voice input based on at least one of the one or more keywords and performs a first command according to the determined intent of the first voice input. The network microphone device may detects that the housing is in a second orientation different than the first orientation. After detecting that the housing is in the second orientation, the network microphone device enables the second mode. Enabling the second mode includes enabling voice input processing via the cloud-based voice assistant service.

Example 2: The method of Example 1, wherein enabling the first mode further comprises disabling the one or more second microphones.

Example 3: The method of any of Examples 1 and 2, wherein enabling the second mode further comprises at least one of: (a) disabling the one or more first microphones or (b) disabling voice input processing via the local natural language unit.

Example 4: The method of any of Examples 1-3, further comprising pairing the NMD to a network device and wherein performing the first command comprises transmitting an instruction over a local area network to the network device.

Example 5: The method of any of Examples 4, wherein the network device comprises a smart illumination device, and wherein the first command is a command to toggle the smart illumination device on or off.

Example 6: The method of any of Example 4, wherein the functions further comprise pairing the NMD to a playback device separate from the network device, wherein the playback device is configured to process playback commands transmitted to the playback device from one or more remote computing devices of the cloud-based voice-assistant service.

Example 7: The method of any of Examples 1-6, further comprising while the second mode is enabled, (i) detecting a sound data stream associated with a second voice input; (ii) detecting a wake-word in the second sound data stream; and (iii) after detecting the wake-word, transmitting the second sound data stream to one or more remote computing devices of the cloud-based voice-assistant service.

Example 8: The method of any of Examples 1-8, wherein the network microphone device further comprises one or more sensors carried in the housing wherein detecting that the housing is in a second orientation different than the first orientation comprises detecting, via the one or sensors, sensor data indicating that the housing has been re-oriented from the first orientation to the second orientation.

Example 9: A tangible, non-transitory, computer-readable medium having instructions stored thereon that are executable by one or more processors to cause a playback device to perform the method of any one of Examples 1-8.

Example 10: A playback device comprising a speaker, a network interface, one or more microphones configured to detect sound, one or more processors, and a tangible, non-tangible computer-readable medium having instructions stored thereon that are executable by the one or more processors to cause the playback device to perform the method of any of Examples 1-8.

The invention claimed is:

1. A network microphone device (NMD) comprising:
   at least one physical control;
   one or more microphones;
   a network interface;
   at least one processor;
   a housing carrying the at least one physical control, the one or more microphones, the network interface, and the at least one processor, and
   at least one non-transitory computer-readable medium comprising program instructions that are executable by the at least one processor such that the NMD is configured to:
   according to a first input to the at least one physical control, enable a first mode, wherein the instructions that are executable by the at least one processor such that the NMD is configured to enable the first mode comprise instructions that are executable by the at least one processor such that the NMD is configured to: (a) disable voice input processing via a cloud-based voice assistant service and (b) enable voice input processing via a local natural language unit;
   while the first mode is enabled: (i) capture sound data associated with a first voice input via the one or more microphones and (ii) detect, via the local natural language unit, that the first voice input comprises sound data matching one or more keywords from a local natural language unit library of the local natural language unit;
   determine, via the local natural language unit, an intent of the first voice input based on at least one of the one or more keywords;
   perform a first command according to the determined intent of the first voice input; and
   according to a second input to the at least one physical control, enable a second mode, wherein the instructions that are executable by the at least one processor such that the NMD is configured to enable the second mode comprise instructions that are executable by the at least one processor such that the NMD is configured to: (a) enable voice input processing via the cloud-based voice assistant service and (b) enable voice input processing via the local natural language unit.

2. The network microphone device of claim 1, wherein the at least one non-transitory computer-readable medium further comprises program instructions that are executable by the at least one processor such that the NMD is configured to:
   while the second mode is enabled, (i) capture additional sound data associated with a second voice input via the one or more microphones; (ii) detect a wake-word in the additional sound data; and (iii) after detection of the wake-word, send at least a portion of the additional sound data to one or more remote computing devices of the cloud-based voice assistant service for processing of the second voice input.

3. The network microphone device of claim 2, wherein the at least one non-transitory computer-readable medium further comprises program instructions that are executable by the at least one processor such that the NMD is configured to:
   while the second mode is enabled: (i) capture further sound data associated with a third voice input via the one or more microphones and (ii) detect, via the local natural language unit, that the third voice input comprises sound data matching one or more keywords from the local natural language unit library of the local natural language unit;
   determine that the local natural language unit is unable to process the third voice input; and
   based on the determination that the local natural language unit is unable to process the third voice input, send at least a portion of the further sound data to the one or more remote computing devices of the cloud-based voice assistant service for processing of the third voice input.

4. The network microphone device of claim 1, wherein the at least one physical control comprises a physical toggle control, and wherein the physical toggle control is selectable to toggle between the first mode and the second mode.

5. The network microphone device of claim 1, wherein the at least one physical control comprises one or more orientation sensors carried in the housing, wherein a first orientation of the housing corresponds to the first mode and a second orientation of the housing corresponds to the second mode; and wherein the at least one non-transitory computer-readable medium further comprises program instructions that are executable by the at least one processor such that the NMD is configured to:
receive, via the one or more orientation sensors, sensor data representing orientation of the housing;
detect, via the sensor data, a re-orientation of the housing from the second orientation to the second orientation, wherein the re-orientation of the housing from the second orientation to the first orientation corresponds to the first input; and
detect, via the sensor data, a re-orientation of the housing from the first orientation to the first orientation, wherein the re-orientation of the housing from the first orientation to the second orientation corresponds to the second input.

6. The network microphone device of claim 5, wherein the one or more microphones comprise at least one first microphone carried by the housing and at least one second microphone carried by the housing, and wherein the at least one non-transitory computer-readable medium further comprises program instructions that are executable by the at least one processor such that the NMD is configured to:
disable the at least one second microphone while in the first mode.

7. The network microphone device of claim 6, wherein the housing comprises a first end and a second end, and wherein the at least one first microphone is carried by the housing on the first end and the at least one second microphone is carried by the housing on the second end.

8. The network microphone device of claim 1, wherein the network microphone device is paired to a network smart device, and wherein the program instructions that are executable by the at least one processor such that the NMD is configured to perform the first command comprise program instructions that are executable by the at least one processor such that the NMD is configured to:
transmit, via the network interface over a local area network, an instruction to the network smart device.

9. The network microphone device of claim 8, wherein the network smart device comprises a smart illumination device, and wherein the first command comprises a command to toggle an illumination state of the smart illumination device.

10. At least one non-transitory computer-readable medium comprising program instructions that are executable by at least one processor such that a network microphone device (NMD) is configured to:
according to a first input to at least one physical control of the NMD, enable a first mode, wherein the instructions that are executable by the at least one processor such that the NMD is configured to enable the first mode comprise instructions that are executable by the at least one processor such that the NMD is configured to: (a) disable voice input processing via a cloud-based voice assistant service and (b) enable voice input processing via a local natural language unit, wherein the NMD comprises one or more microphones, a network interface; the at least one processor, and a housing carrying the at least one physical control, the one or more microphones, the network interface, and the at least one processor;
while the first mode is enabled: (i) capture sound data associated with a first voice input via the one or more microphones and (ii) detect, via the local natural language unit, that the first voice input comprises sound data matching one or more keywords from a local natural language unit library of the local natural language unit;
determine, via the local natural language unit, an intent of the first voice input based on at least one of the one or more keywords;
perform a first command according to the determined intent of the first voice input; and
according to a second input to the at least one physical control, enable a second mode, wherein the instructions that are executable by the at least one processor such that the NMD is configured to enable the second mode comprise instructions that are executable by the at least one processor such that the NMD is configured to: (a) enable voice input processing via the cloud-based voice assistant service and (b) enable voice input processing via the local natural language unit.

11. The at least one non-transitory computer-readable medium of claim 10, wherein the at least one non-transitory computer-readable medium further comprises program instructions that are executable by the at least one processor such that the NMD is configured to:
while the second mode is enabled, (i) capture additional sound data associated with a second voice input via the one or more microphones; (ii) detect a wake-word in the additional sound data; and (iii) after detection of the wake-word, send at least a portion of the additional sound data to one or more remote computing devices of the cloud-based voice assistant service for processing of the second voice input.

12. The at least one non-transitory computer-readable medium of claim 11, wherein the at least one non-transitory computer-readable medium further comprises program instructions that are executable by the at least one processor such that the NMD is configured to:
while the second mode is enabled: (i) capture further sound data associated with a third voice input via the one or more microphones and (ii) detect, via the local natural language unit, that the third voice input comprises sound data matching one or more keywords from the local natural language unit library of the local natural language unit;
determine that the local natural language unit is unable to process the third voice input; and
based on the determination that the local natural language unit is unable to process the third voice input, send at least a portion of the further sound data to the one or more remote computing devices of the cloud-based voice assistant service for processing of the third voice input.

13. The at least one non-transitory computer-readable medium of claim 10, wherein the at least one physical control comprises a physical toggle control, and wherein the physical toggle control is selectable to toggle between the first mode and the second mode.

14. The at least one non-transitory computer-readable medium of claim 10, wherein the at least one physical control comprises one or more orientation sensors carried in the housing, wherein a first orientation of the housing corresponds to the first mode and a second orientation of the housing corresponds to the second mode; and wherein the at least one non-transitory computer-readable medium further comprises program instructions that are executable by the at least one processor such that the NMD is configured to:

receive, via the one or more orientation sensors, sensor data representing orientation of the housing;

detect, via the sensor data, a re-orientation of the housing from the second orientation to the second orientation, wherein the re-orientation of the housing from the second orientation to the first orientation corresponds to the first input; and detect, via the sensor data, a re-orientation of the housing from the first orientation to the first orientation, wherein the re-orientation of the housing from the first orientation to the second orientation corresponds to the second input.

15. The at least one non-transitory computer-readable medium of claim 14, wherein the one or more microphones comprise at least one first microphone carried by the housing and at least one second microphone carried by the housing, and wherein the at least one non-transitory computer-readable medium further comprises program instructions that are executable by the at least one processor such that the NMD is configured to:

disable the at least one second microphone while in the first mode.

16. The at least one non-transitory computer-readable medium of claim 15, wherein the housing comprises a first end and a second end, and wherein the at least one first microphone is carried by the housing on the first end and the at least one second microphone is carried by the housing on the second end.

17. The at least one non-transitory computer-readable medium of claim 10, wherein the network microphone device is paired to a network smart device, and wherein the program instructions that are executable by the at least one processor such that the NMD is configured to perform the first command comprise program instructions that are executable by the at least one processor such that the NMD is configured to:

transmit, via the network interface over a local area network, an instruction to the network smart device.

18. The at least one non-transitory computer-readable medium of claim 17, wherein the network smart device comprises a smart illumination device, and wherein the first command comprises a command to toggle an illumination state of the smart illumination device.

19. A method to be performed by a network microphone device comprising at least one physical control and one or more microphones, the method comprising:

according to a first input to the at least one physical control, enabling a first mode, wherein enabling the first mode comprises: (a) disabling voice input processing via a cloud-based voice assistant service and (b) enabling voice input processing via a local natural language unit;

while the first mode is enabled: (i) capturing sound data associated with a first voice input via the one or more microphones and (ii) detecting, via the local natural language unit, that the first voice input comprises sound data matching one or more keywords from a local natural language unit library of the local natural language unit;

determining, via the local natural language unit, an intent of the first voice input based on at least one of the one or more keywords;

performing a first command according to the determined intent of the first voice input; and according to a second input to the at least one physical control, enabling a second mode, wherein enabling the second mode comprises: (a) enabling voice input processing via the cloud-based voice assistant service and (b) enabling voice input processing via the local natural language unit.

20. The method of claim 19, further comprising:

while the second mode is enabled, (i) capturing additional sound data associated with a second voice input via the one or more microphones; (ii) detecting a wake-word in the additional sound data; and (iii) after detecting the wake-word, sending at least a portion of the additional sound data to one or more remote computing devices of the cloud-based voice assistant service for processing of the second voice input.

\* \* \* \* \*